(12) United States Patent
Yamashita et al.

(10) Patent No.: US 7,595,583 B2
(45) Date of Patent: Sep. 29, 2009

(54) COLD-CATHODE FLUORESCENT LAMP AND BACKLIGHT UNIT

(75) Inventors: Hirofumi Yamashita, Moriguchi (JP);
Toshihiro Terada, Amagasaki (JP);
Yusuke Mori, Fukuchiyama (JP); Haruo Yamazaki, Moriyama (JP); Takashi Maniwa, Takatsuki (JP); Koji Takasaki, Fukuchiyama (JP)

(73) Assignee: Panasonic Corporation, Osaka (JP)

( * ) Notice: Subject to any disclaimer, the term of this patent is extended or adjusted under 35 U.S.C. 154(b) by 591 days.

(21) Appl. No.: 11/058,868

(22) Filed: Feb. 16, 2005

(65) Prior Publication Data
US 2005/0184640 A1    Aug. 25, 2005

(30) Foreign Application Priority Data

| Feb. 25, 2004 | (JP) | ............................ 2004-049987 |
| Mar. 19, 2004 | (JP) | ............................ 2004-080342 |
| Apr. 15, 2004 | (JP) | ............................ 2004-120724 |

(51) Int. Cl.
*H01J 1/62* (2006.01)
*H01J 17/18* (2006.01)
*F21K 2/00* (2006.01)

(52) U.S. Cl. .................. 313/493; 362/225; 362/216; 362/614; 313/634; 313/635; 313/491

(58) Field of Classification Search ............... 313/493, 313/632–635, 618; 315/60; 345/76.1
See application file for complete search history.

(56) References Cited

U.S. PATENT DOCUMENTS

| 2,167,275 | A | * | 7/1939 | Gross et al. ................. 378/138 |
| 4,342,937 | A | * | 8/1982 | Nagel ............................ 313/47 |
| 5,075,603 | A | * | 12/1991 | Yoshiike ...................... 315/335 |
| 5,424,609 | A | * | 6/1995 | Geven et al. ................. 313/623 |
| 5,471,278 | A | * | 11/1995 | Yasuda et al. ................... 355/67 |
| 5,686,795 | A | * | 11/1997 | Sakoske et al. .............. 313/613 |
| 5,815,224 | A | * | 9/1998 | Hasegawa et al. .............. 349/58 |
| 5,905,334 | A | * | 5/1999 | Nakamura et al. ........... 313/491 |
| 5,962,977 | A | * | 10/1999 | Matsumoto et al. .......... 313/633 |
| 6,135,620 | A | * | 10/2000 | Marsh .......................... 362/377 |
| 6,316,872 | B1 | * | 11/2001 | Ge et al. ....................... 313/493 |
| 6,356,019 | B1 | * | 3/2002 | Hutcherson et al. ......... 313/631 |
| 6,515,721 | B2 | * | 2/2003 | Jin et al. ......................... 349/58 |
| 6,522,059 | B1 | * | 2/2003 | Park et al. .................... 313/417 |
| 6,616,310 | B1 | * | 9/2003 | Marsh .......................... 362/377 |
| 6,654,088 | B2 | * | 11/2003 | Morishita et al. ............ 349/113 |
| 6,747,403 | B2 | * | 6/2004 | Spears .......................... 313/485 |
| 6,800,997 | B2 | * | 10/2004 | Yamashita et al. ........... 313/618 |
| 6,810,208 | B2 | * | 10/2004 | Saiki et al. ................... 396/155 |
| 6,815,883 | B2 | * | 11/2004 | Chow et al. ................... 313/493 |

(Continued)

FOREIGN PATENT DOCUMENTS

CN         2389417         7/2000

(Continued)

*Primary Examiner*—Sikha Roy
*Assistant Examiner*—Tracie Y Green

(57) ABSTRACT

A cold-cathode fluorescent lamp including a glass bulb and a pair of electrodes which are cylindrical and respectively inserted in two ends of the glass bulb. Two end portions of the glass bulb are substantially circular in transverse cross section, the two end portions respectively corresponding to the inserted pair of electrodes in length. At least part of a middle portion of the glass bulb is flat in transverse cross section, the middle portion corresponding to a space in the glass bulb between the pair of electrodes.

22 Claims, 31 Drawing Sheets

U.S. PATENT DOCUMENTS

| | | | |
|---|---|---|---|
| 6,857,926 B1 * | 2/2005 | Sulcs et al. | 445/26 |
| 2001/0000421 A1 * | 4/2001 | Ge | 313/493 |
| 2002/1007495 * | 6/2002 | Lovell et al. | 315/248 |
| 2002/0135299 A1 * | 9/2002 | Chow et al. | 313/558 |
| 2002/0158580 A1 * | 10/2002 | Uemura et al. | 313/643 |
| 2003/0025433 A1 * | 2/2003 | Versluijs et al. | 313/318.1 |
| 2003/0123258 A1 * | 7/2003 | Nitto et al. | 362/373 |
| 2003/0142245 A1 * | 7/2003 | Kim | 349/65 |
| 2003/0230113 A1 * | 12/2003 | Gedeon et al. | 65/33.3 |
| 2004/0140773 A1 * | 7/2004 | Moon | 315/120 |
| 2005/0007020 A1 * | 1/2005 | Tsuda et al. | 313/634 |
| 2005/0151477 A1 | 7/2005 | Iida et al. | |
| 2005/0184632 A1 * | 8/2005 | Galvez et al. | 313/113 |

FOREIGN PATENT DOCUMENTS

| | | |
|---|---|---|
| JP | 10-003879 | 6/1998 |
| JP | 2000-310778 | 11/2000 |
| JP | 2002-289138 | 10/2002 |
| JP | 2003-36723 | 2/2003 |
| JP | 2003-187750 | 7/2003 |
| JP | 2003-323862 | 11/2003 |
| JP | 2004-063469 | 2/2004 |
| JP | 2006-024548 | 1/2006 |
| WO | WO 03/060951 A2 * | 7/2003 |
| WO | WO 03/083895 | 10/2003 |

* cited by examiner

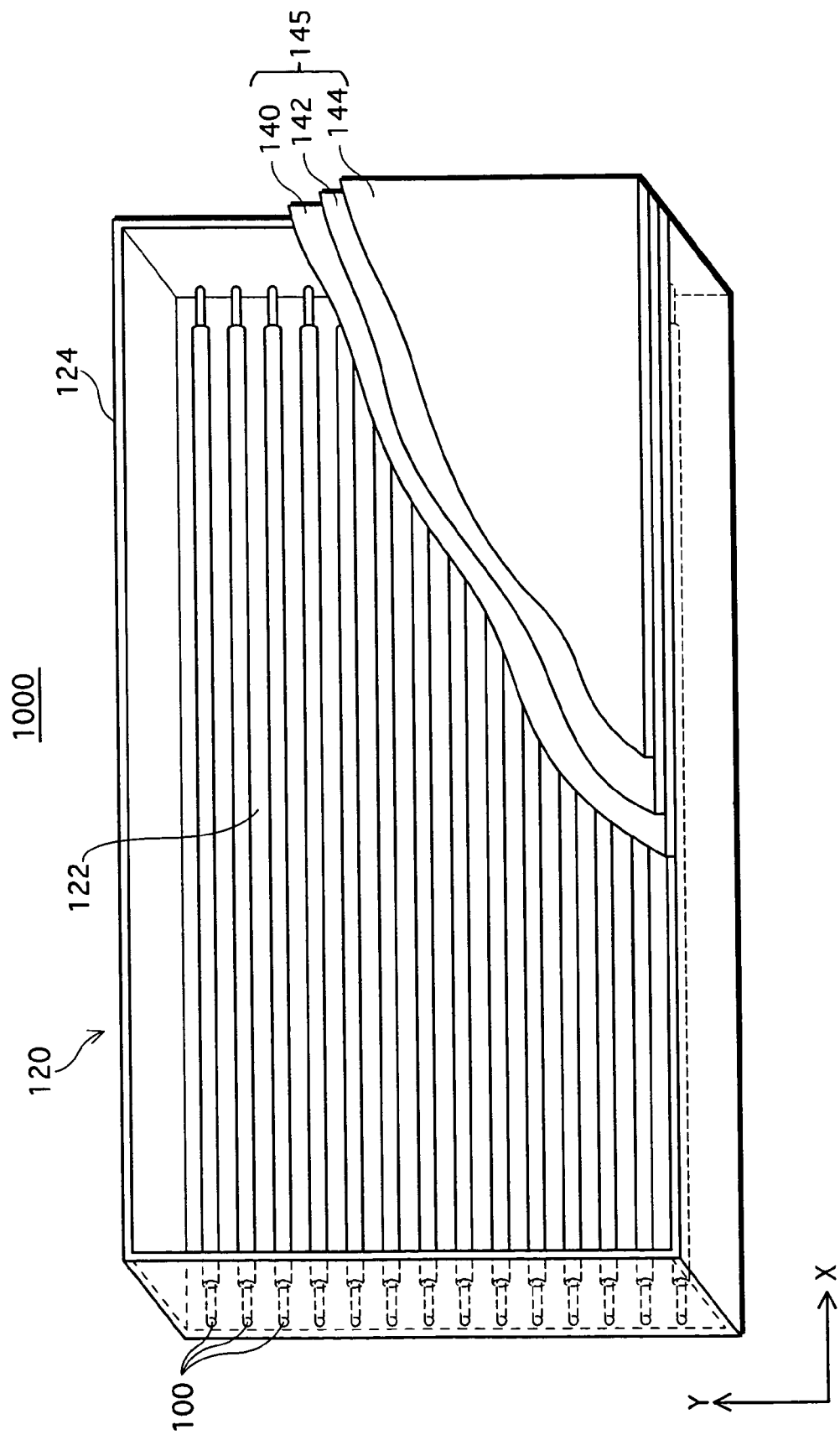

FIG.5

| | INNER DIAMETER (mm) | OUTER DIAMETER (mm) | LAMP CURRENT (mA) | LAMP EFFICIENCY (lm/w) | NUMBER OF LAMPS | BRIGHTNESS (cd/m²) | UNEVEN BRIGHTNESS |
|---|---|---|---|---|---|---|---|
| STRAIGHT TUBE LAMP A | 4.0 | 5.0 | 8.5 | 55 | 15 | 9500 | YES |
| STRAIGHT TUBE LAMP B | 3.0 | 4.0 | 5.5 | 60 | 16 | 8000 | NO |
| LAMP 100 | 3.0, 4.8 | 4.0, 5.8 | 8.5 | 65 | 14 | 11400 | NO |

FIG.10

| TYPE | Ne | Ar | Kr | GAS PRESSURE (Torr) | No. | 0°C STARTING VOLTAGE | 25°C STARTING VOLTAGE |
|---|---|---|---|---|---|---|---|
| C | 95 | 5 | | 40 | 1 | 1310 | 1058 |
| | | | | | 2 | 1294 | 1048 |
| | | | | | 3 | 1304 | 1063 |
| | | | | | 4 | 1286 | 1038 |
| | | | | | 5 | 1286 | 1034 |
| | | | | 50 | 1 | 1404 | 1152 |
| | | | | | 2 | 1399 | 1144 |
| | | | | | 3 | 1385 | 1132 |
| | | | | | 4 | 1409 | 1148 |
| | | | | | 5 | 1386 | 1122 |
| | | | | 60 | 1 | 1516 | 1197 |
| | | | | | 2 | 1530 | 1220 |
| | | | | | 3 | 1476 | 1218 |
| | | | | | 4 | 1492 | 1225 |
| | | | | | 5 | 1478 | 1214 |

FIG.11

| TYPE | Ne | Ar | Kr | GAS PRESSURE (Torr) | No. | 0°C STARTING VOLTAGE | 25°C STARTING VOLTAGE |
|---|---|---|---|---|---|---|---|
| D-1 | 95 | 2 | 3 | 40 | 1 | 1220 | 1041 |
| | | | | | 2 | 1225 | 1050 |
| | | | | | 3 | 1203 | 1028 |
| | | | | | 4 | 1230 | 1055 |
| | | | | | 5 | 1218 | 1045 |
| | | | | 50 | 1 | 1314 | 1149 |
| | | | | | 2 | 1304 | 1138 |
| | | | | | 3 | 1300 | 1141 |
| | | | | | 4 | 1297 | 1131 |
| | | | | | 5 | 1320 | 1153 |
| | | | | 60 | 1 | 1341 | 1180 |
| | | | | | 2 | 1345 | 1179 |
| | | | | | 3 | 1342 | 1186 |
| | | | | | 4 | 1342 | 1179 |
| | | | | | 5 | 1344 | 1177 |

FIG.12

| TYPE | Ne | Ar | Kr | GAS PRESSURE (Torr) | No. | 0°C STARTING VOLTAGE | 25°C STARTING VOLTAGE |
|---|---|---|---|---|---|---|---|
| D-2 | 95 | 4 | 1 | 40 | 1 | 1290 | 1103 |
| | | | | | 2 | 1286 | 1098 |
| | | | | | 3 | 1287 | 1103 |
| | | | | | 4 | 1296 | 1104 |
| | | | | | 5 | 1285 | 1097 |
| | | | | 50 | 1 | 1349 | 1165 |
| | | | | | 2 | 1362 | 1191 |
| | | | | | 3 | 1362 | 1179 |
| | | | | | 4 | 1371 | 1180 |
| | | | | | 5 | 1356 | 1180 |
| | | | | 60 | 1 | 1409 | 1228 |
| | | | | | 2 | 1411 | 1228 |
| | | | | | 3 | 1423 | 1235 |
| | | | | | 4 | 1417 | 1227 |
| | | | | | 5 | 1423 | 1244 |

FIG.13

| TYPE | Ne | Ar | Kr | GAS PRESSURE (Torr) | No. | 0°C STARTING VOLTAGE | 25°C STARTING VOLTAGE |
|---|---|---|---|---|---|---|---|
| D-3 | 94.5 | 5 | 0.5 | 40 | 1 | 1276 | 1089 |
| | | | | | 2 | 1252 | 1076 |
| | | | | | 3 | 1239 | 1072 |
| | | | | | 4 | 1244 | 1059 |
| | | | | | 5 | 1266 | 1079 |
| | | | | 50 | 1 | 1352 | 1173 |
| | | | | | 2 | 1314 | 1134 |
| | | | | | 3 | 1331 | 1155 |
| | | | | | 4 | 1328 | 1149 |
| | | | | | 5 | 1316 | 1134 |
| | | | | 60 | 1 | 1400 | 1225 |
| | | | | | 2 | 1427 | 1239 |
| | | | | | 3 | 1404 | 1228 |
| | | | | | 4 | 1434 | 1256 |
| | | | | | 5 | 1417 | 1239 |

FIG.14

| TYPE | Ne | Ar | Kr | GAS PRESSURE (Torr) | No. | 0°C STARTING VOLTAGE | 25°C STARTING VOLTAGE |
|---|---|---|---|---|---|---|---|
| D-4 | 93 | 5 | 2 | 40 | 1 | 1263 | 1076 |
| | | | | | 2 | 1277 | 1097 |
| | | | | | 3 | 1270 | 1079 |
| | | | | | 4 | 1266 | 1077 |
| | | | | | 5 | 1258 | 1077 |
| | | | | 50 | 1 | 1345 | 1170 |
| | | | | | 2 | 1376 | 1201 |
| | | | | | 3 | 1369 | 1191 |
| | | | | | 4 | 1387 | 1206 |
| | | | | | 5 | 1361 | 1183 |
| | | | | 60 | 1 | 1411 | 1232 |
| | | | | | 2 | 1400 | 1228 |
| | | | | | 3 | 1392 | 1210 |
| | | | | | 4 | 1397 | 1222 |
| | | | | | 5 | 1400 | 1220 |

FIG.15

| TYPE | Ne | Ar | Kr | GAS PRESSURE (Torr) | No. | 0°C STARTING VOLTAGE | 25°C STARTING VOLTAGE |
|---|---|---|---|---|---|---|---|
| D-5 | 90 | 5 | 5 | 40 | 1 | 1215 | 1048 |
| | | | | | 2 | 1246 | 1072 |
| | | | | | 3 | 1215 | 1048 |
| | | | | | 4 | 1245 | 1073 |
| | | | | | 5 | 1230 | 1055 |
| | | | | 50 | 1 | 1308 | 1141 |
| | | | | | 2 | 1318 | 1145 |
| | | | | | 3 | 1330 | 1156 |
| | | | | | 4 | 1323 | 1153 |
| | | | | | 5 | 1316 | 1141 |
| | | | | 60 | 1 | 1427 | 1258 |
| | | | | | 2 | 1399 | 1232 |
| | | | | | 3 | 1407 | 1238 |
| | | | | | 4 | 1427 | 1249 |
| | | | | | 5 | 1423 | 1259 |

FIG.18

| TYPE | Ne | Ar | Kr | GAS PRESSURE (Torr) | No. | 0°C STARTING VOLTAGE | 25°C STARTING VOLTAGE |
|---|---|---|---|---|---|---|---|
| E | 95 | | 5 | 40 | 1 | 1169 | 1019 |
| | | | | | 2 | 1201 | 1053 |
| | | | | | 3 | 1173 | 1022 |
| | | | | | 4 | 1172 | 1014 |
| | | | | | 5 | 1172 | 1019 |
| | | | | 50 | 1 | 1239 | 1111 |
| | | | | | 2 | 1231 | 1087 |
| | | | | | 3 | 1246 | 1101 |
| | | | | | 4 | 1246 | 1103 |
| | | | | | 5 | 1244 | 1097 |
| | | | | 60 | 1 | 1303 | 1172 |
| | | | | | 2 | 1323 | 1187 |
| | | | | | 3 | 1289 | 1146 |
| | | | | | 4 | 1301 | 1169 |
| | | | | | 5 | 1306 | 1167 |

COLD-CATHODE FLUORESCENT LAMP AND BACKLIGHT UNIT

BACKGROUND OF THE INVENTION (1) Field of the Invention

The present invention relates to a cold-cathode fluorescent lamp and a backlight unit that is used for a LCD (Liquid Crystal Display) apparatus.

(2) Description of the Related Art

A backlight unit, which is attached to the back of a LCD panel, is used as a light source of a LCD apparatus.

Backlight units are classified into two types: an edge-light type; and a direct-below type (see, for example, Japanese Laid-Open Patent Application No. 2000-310778).

Of these, the direct-below-type backlight units have an outer container composed of a bottom plate and side plates surrounding the bottom plate, and an opening of the outer container is covered with a diffusion plate, a diffusion sheet or the like. A plurality of fluorescent lamps are arranged in the outer container, close to the bottom. The direct-below-type backlight units are often adopted in large-scale LCD apparatuses such as 32-inch LCD televisions since it is relatively easy to achieve high brightness at the surface (hereinafter referred to as a light-emitting surface).

To achieve the high-quality image of the LCD apparatuses, such back light units are required to have high and even brightness on the light-emitting surface. Also, to enable the LCD apparatuses to occupy as little space as possible, backlight units are required to be thin.

For this reason, the inner surfaces of the outer container are coated with a material having high optical reflectance so that light radiated from the fluorescent lamps backward is reflected forward (toward the light-emitting surface) to increase the efficiency in effectively using the light fluxes radiated from the lamps (the efficiency represented by a ratio of light fluxes radiated from the light-emitting surface to light fluxes radiated from the lamp). Also, the above-mentioned diffusion plate and the diffusion sheet are used to cause the direct light from the fluorescent lamps and reflected light to diffuse in the forward direction so that even brightness is secured all over the light-emitting surface.

Cold-cathode fluorescent lamps are often used as the fluorescent lamps. This is because the cold-cathode fluorescent lamps can be made thin with small diameters since they do not have filament coils, and this satisfies the demands for thin backlight units.

To achieve the high-quality image of the LCD apparatuses, such backlight units are further required to have high brightness.

One might think as a method for achieving the high brightness in the backlight units that the cold-cathode fluorescent lamps (hereinafter referred to as lamps) may be operated at an increased lamp current. However, this method has a problem that although the lamp light fluxes increase to some extent, the coldest-point temperature increases and exceeds an optimum range as the lamp current increases, thereby reducing the lamp light-emission efficiency (hereinafter referred to as lamp efficiency).

If, together with the increase of the lamp current, thicker lamps are used to improve the heat radiation, the coldest-point temperature will be prevented from excessively increasing. However, this method has a problem that if especially the inner diameter is increased, the distance between the tube inner wall and the center of the positive column plasma space increases, which reduces the light-emitting efficiency and prevents as much increase in the light fluxes as expected in correspondence with the increase in the lamp current from being obtained. In addition to this, the backlight units have limited space for housing the lamps. If lamps thicker than conventional ones are used in such backlight units, what is called "uneven brightness" occurs (hereinafter, such uneven brightness is referred to as "wavy uneven brightness") in which regions on the light-emitting surface closer to the lamps have higher brightness, and regions farther away from the lamps have lower brightness. This problem can be solved by making the housing space thick, and arranging the lamps with a certain distance from the light-emitting surface. However, this method is not practical since, as described earlier, the demand for thin backlight units is strong.

SUMMARY OF THE INVENTION

The object of the present invention is therefore to provide a cold-cathode fluorescent lamp that can be housed in a limited housing space of a backlight unit and in which the light-emission efficiency is not reduced if the lamp current is increased, and to provide a backlight unit using the cold-cathode fluorescent lamp.

The above object is fulfilled by a cold-cathode fluorescent lamp comprising: a glass bulb; and a pair of electrodes which are cylindrical and respectively inserted in two ends of the glass bulb, wherein two end portions of the glass bulb are substantially circular in transverse cross section, the two end portions respectively corresponding to the inserted pair of electrodes in length, and at least part of a middle portion of the glass bulb is flat in transverse cross section, the middle portion corresponding to a space in the glass bulb between the pair of electrodes.

With the above-described construction, the cold-cathode fluorescent lamp of the present invention has a larger outer surface area than a conventional cold-cathode fluorescent lamp whose outer diameter is approximately equal to the minimum outer diameter of the flat shape in the transverse cross section, enabling an excessive increase of the coldest-point temperature to be restricted. Also, since the minimum inner diameter of the flat shape in the transverse cross section is shorter than an inner diameter of a conventional cold-cathode fluorescent lamp that is approximately equal to the maximum inner diameter of the flat shape, the distance between the center of the positive column plasma space and the inner wall of the bulb is effectively kept to be short. As a result, if a larger lamp current than conventional one is applied, the light emission efficiency is hardly decreased. Also, such cold-cathode fluorescent lamps of the present invention can be housed in a direct-below-type backlight unit without increasing the thickness of the limited housing space.

In the above-stated cold-cathode fluorescent lamp, the glass bulb may be filled with a mix gas of rare gases which include at least neon and krypton.

With the above-described construction of the cold-cathode fluorescent lamp, it is possible to reduce the starting voltage at around 0° C. compared with conventional cold-cathode fluorescent lamps which are filled a mix gas of mainly neon and argon, and to achieve a high lamp efficiency under the condition of a higher ambient temperature than in conventional cold-cathode fluorescent lamps.

Also, by using the above-described cold-cathode fluorescent lamp in a backlight unit, it is possible to reduce the starting voltage than in backlight units using conventional cold-cathode fluorescent lamps. This makes it possible to reduce the size of the power unit connected to the backlight unit. Furthermore, even if more cold-cathode fluorescent lamps are used in a backlight unit and the temperature in the backlight unit reaches a high temperature compared with the case of conventional cold-cathode fluorescent lamps during the lighting, the cold-cathode fluorescent lamps of the present invention emit light with a lamp efficiency equal to or higher than that of the conventional ones. Accordingly, the brightness of the backlight unit increases as a whole by the present invention.

The above-stated cold-cathode fluorescent lamp may further comprise: a first lead wire that is attached to a first end of the glass bulb; and a second lead wire that is attached to a second end of the glass bulb, wherein a first electrode, which is one of the pair of electrodes, is connected to an end of the first lead wire inside the glass bulb, and a second electrode, which is the other of the pair of electrodes, is connected to an end of the second lead wire inside the glass bulb, wherein an end of the first lead wire outside the glass bulb is connected to high-voltage-side wiring connecting to an external power source, and an end of the second lead wire outside the glass bulb is connected to ground-side wiring connecting to the external power source, the ground-side wiring being lower than the high-voltage-side wiring in heat conductivity, and materials of the first electrode and the second electrode are selected so that when the cold-cathode fluorescent lamp is lighted, the first electrode is higher than the second electrode in heating value.

With the above-described construction, it is possible to extend the lamp life by eliminating the problem of the disequilibrium in the temperature between the two ends of the glass bulb.

The above-stated cold-cathode fluorescent lamp may further comprise: a first lead wire that is attached to a first end of the glass bulb; and a second lead wire that is attached to a second end of the glass bulb, wherein a first electrode, which is one of the pair of electrodes, is connected to an end of the first lead wire inside the glass bulb, and a second electrode, which is the other of the pair of electrodes, is connected to an end of the second lead wire inside the glass bulb, wherein an end of the first lead wire outside the glass bulb is connected to high-voltage-side wiring connecting to an external power source, and an end of the second lead wire outside the glass bulb is connected to ground-side wiring connecting to the external power source, the ground-side wiring being lower than the high-voltage-side wiring in heat conductivity, and the first lead wire is lower than the second lead wire in heat conductivity.

With the above-described construction, it is possible to extend the lamp life by eliminating the problem of the disequilibrium in the temperature between the two ends of the glass bulb.

The object of the present invention is also fulfilled by a backlight unit comprising: the cold-cathode fluorescent lamp defined in claim 1 in which a first lead wire, which is connected to a first electrode being one of the pair of electrodes, extends out from one of the two ends of the glass bulb, and a second lead wire, which is connected to a second electrode being the other of the pair of electrodes, extends out from the other of the two ends of the glass bulb; high-voltage-side wiring that is connected to the first lead wire to supply power from a power circuit; ground-side wiring that is connected to the second lead wire to supply power from the power circuit, the ground-side wiring being lower than the high-voltage-side wiring in heat conductivity; a first electrically insulating bush that is attached firmly to the end of the glass bulb from which the first lead wire extends out, and covers the end of the glass bulb and the first lead wire; a second electrically insulating bush that is attached firmly to and covers the end of the glass bulb from which the second lead wire extends out; a supporting member which, made of a material higher than the first and second electrically insulating bushes in heat conductivity, supports the first and second electrically insulating bushes, wherein an arrangement is made so that heat conduction from the first electrically insulating bush to the supporting member is lower than heat conduction from the second electrically insulating bush to the supporting member in heat conductivity.

With the above-described construction, it is possible to extend the lamp life by eliminating the problem of the disequilibrium in the temperature between the two ends of the glass bulb.

The object of the present invention is also fulfilled by a backlight unit comprising: the cold-cathode fluorescent lamp defined in claim 1 in which a first lead wire, which is connected to a first electrode being one of the pair of electrodes, extends out from one of the two ends of the glass bulb, and a second lead wire, which is connected to a second electrode being the other of the pair of electrodes, extends out from the other of the two ends of the glass bulb; high-voltage-side wiring that is connected to the first lead wire to supply power from a power circuit; ground-side wiring that is connected to the second lead wire to supply power from the power circuit, the ground-side wiring being lower than the high-voltage-side wiring in heat conductivity; a first electrically insulating bush that is attached firmly to and covers the end of the glass bulb from which the first lead wire extends out; and a second electrically insulating bush that is attached firmly to and covers the end of the glass bulb from which the second lead wire extends out, wherein the first electrically insulating bush is lower than the second electrically insulating bush in heat radiation in terms of heat absorbed from a surface of the glass bulb when the cold-cathode fluorescent lamp is lighted.

With the above-described construction, it is possible to extend the lamp life by eliminating the problem of the disequilibrium in the temperature between the two ends of the glass bulb.

In the above-stated cold-cathode fluorescent lamp, a portion of the glass bulb, which corresponds to a middle part of an area inside the glass bulb where a positive column is generated when the cold-cathode fluorescent lamp is lighted, may be flat in transverse cross section.

In the above-stated cold-cathode fluorescent lamp, a value, which is obtained by dividing (i) a value of an amount of power consumed by a positive column discharge by (ii) a value of an outer surface area of a portion of the glass bulb which corresponds to an area inside the glass bulb where a positive column is generated when the cold-cathode fluorescent lamp is lighted, may be set to be in a range from 45 $mW/cm^2$ to 90 $mW/cm^2$.

In the above-stated cold-cathode fluorescent lamp, a minimum inner diameter of a flat shape of the glass bulb in transverse cross section may be in a range from 1.0 mm to 3.0 mm.

The above object of the present invention is also fulfilled by a backlight unit comprising: a rectangular outer container whose bottom is a reflection plate and sides are plates; and a plurality of cold-cathode fluorescent lamps that are arranged in parallel to each other at regular intervals in the outer container, wherein each of the plurality of cold-cathode fluorescent lamps includes a glass bulb and a pair of electrodes which are cylindrical and respectively inserted in two ends of the glass bulb, wherein two end portions of the glass bulb are substantially circular in transverse cross section, the two end portions respectively corresponding to the inserted pair of electrodes in length, and at least part of a middle portion of the glass bulb is flat in transverse cross section, the middle portion corresponding to a space in the glass bulb between the pair of electrodes, and the plurality of cold-cathode fluorescent lamps being arranged so that a long axis of a flat shape of the glass bulb in the transverse cross section is substantially in parallel with a main surface of the reflection plate.

In the above-stated cold-cathode fluorescent lamp, the first electrode may be smaller than the second electrode in effective electrode surface area.

In the above-stated cold-cathode fluorescent lamp, a value of area ratio obtained by dividing a value of effective electrode surface area of the first electrode by a value of effective electrode surface area of the second electrode may be set to be in a range from 0.5 to 0.9.

In the above-stated cold-cathode fluorescent lamp, a metal material forming the first electrode may be higher than a metal material forming the second electrode in work function.

In the above-stated cold-cathode fluorescent lamp, the first lead wire may be smaller than the second lead wire in cross section area.

In the above-stated cold-cathode fluorescent lamp, the first and second lead wires may be circular in transverse cross section, and a value of wire diameter ratio obtained by dividing a value of outer diameter of the first lead wire by a value of outer diameter of the second lead wire is set to be in a range from 0.65 to 0.85.

In the above-stated backlight unit, a heat insulating medium, which is lower than the first electrically insulating bush in heat conductivity, may be disposed between the first electrically insulating bush and the supporting member, and the second electrically insulating bush may be in direct contact with the supporting member.

In the above-stated backlight unit, an area with which the first electrically insulating bush is in contact with the supporting member maybe smaller than an area with which the second electrically insulating bush is in contact with the supporting member.

In the above-stated backlight unit, a contact pressure with which the first electrically insulating bush is in contact with the supporting member may be lower than a contact pressure with which the second electrically insulating bush is in contact with the supporting member.

In the above-stated backlight unit, a heat radiation area of the first electrically insulating bush may be lower than a heat radiation area of the second electrically insulating bush.

In the above-stated backlight unit, the first electrically insulating bush may be made of a material that is lower than a material of the second electrically insulating bush in heat conductivity.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 shows the construction of a direct-below-type backlight unit in Embodiment 1;

FIG. 5 is a table showing results of experiments that were conducted to measure the lamp efficiency and the brightness at the center of the light-emitting surface of the backlight unit;

FIG. 8A is a plot of mix ratio between neon and argon versus starting voltage, and FIG. 8B is a plot of mix ratio between neon and argon versus lamp efficiency;

FIG. 10 is a table showing the results of a comparative experiment on the starting voltage;

FIG. 11 is a table showing the results of a comparative experiment on the starting voltage;

FIG. 12 is a table showing the results of a comparative experiment on the starting voltage;

FIG. 13 is a table showing the results of a comparative experiment on the starting voltage;

FIG. 14 is a table showing the results of a comparative experiment on the starting voltage;

FIG. 15 is a table showing the results of a comparative experiment on the starting voltage;

FIG. 18 is a table showing the measurement results of the comparative experiment on the starting voltage;

DESCRIPTION OF THE PREFERRED EMBODIMENT

The following describes preferred embodiments of the present invention, with reference to the attached drawings.

Embodiment 1

Figures 1A, 1B, 1C, 1D:
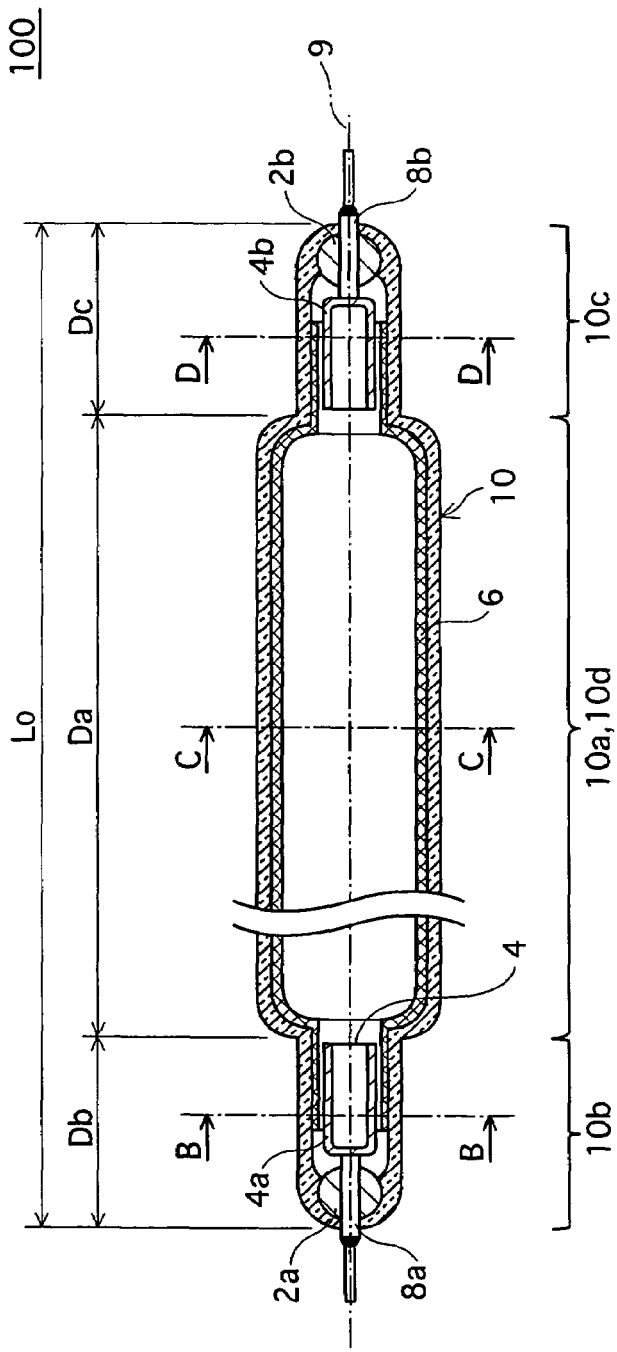
FIGS. 1A-1D are cross-sectional views of a cold-cathode fluorescent lamp in Embodiment 1.

FIG. 1A is a cross sectional view of a cold-cathode fluorescent lamp (hereinafter referred to as a lamp) 100 in Embodiment 1. FIG. 1B is a sectional view taken along line B-B of FIG. 1A. FIG. 1C is a sectional view taken along line C-C of FIG. 1A. FIG. 1D is a sectional view taken along line D-D of FIG. 1A. It should be noted here that FIGS. 1B and 1D show sectional views of only a glass bulb 10 and a fluorescent substance 6 for the sake of conciseness.

As shown in FIG. 1A, the lamp 100 includes: a glass bulb 10 made of borosilicate glass; and electrodes 4a and 4b that are respectively disposed inside the glass bulb 10 at both ends thereof.

The two ends of the glass bulb 10 are blocked by glass beads 2a and 2b, respectively. Through the beads 2a and 2b, lead wires 8a and 8b made of tungsten are respectively introduced from outside into the glass bulb 10 to hold the electrodes 4a and 4b, which are made of niobium or the like and in the shape of a cylinder with a bottom.

The electrodes 4a and 4b are hollow-type electrodes, and are 5.0 mm in length and 0.1 mm in thickness. The distance between the outer surface of the electrodes 4a and 4b and the inner surface of the glass bulb 10 is set to be as narrow as 2 mm or smaller. This narrow space is designed to prevent discharge from leaking into the space, thus preventing mercury from wasting by sputtering (for details, see Japanese Laid-Open Patent Application No. 2002-289138 or the like).

Though not illustrated, the glass bulb 10 is filled with mercury of approximately 2.0 mg and a neon/argon mix gas (Ne 95%-Ar 5%) with the pressure of 8.0 kPa at the normal temperature.

Also, the inner surface of the glass bulb 10 is coated with a rare-earth fluorescent substance 6 that is made by mixing: red fluorescent substance ($Y_2O_3$: $Eu^{3+}$); green fluorescent substance ($LaPO_4$: $Ce^{3+}$, $Tb^{3+}$); and blue fluorescent substance ($BaMg_2Al_{16}O_{27}$: $Eu^{2+}$).

In the following description, two end portions of the glass bulb 10, which respectively correspond in length to the electrode 4a and the electrode 4b inserted in the ends of the glass bulb 10, are referred to as electrode portions 10b and 10c. Also, a portion, which corresponds to an area where a positive column is substantially generated when the lamp 100 is lighted, of the glass bulb 10 excluding the electrode portions 10b and 10c is referred to as a positive column light emitting portion 10a.

Further, the light emission through a middle portion of the positive column light emitting portion 10a contributes to the lighting by the lighting apparatus for which the lamp 100 is used. The middle portion of the positive column light emitting portion 10a is referred to as a light extraction portion 10d. For example, when the lamp 100 is used for a liquid crystal backlight unit, the light extraction portion 10d is a portion whose light emission contributes to the lighting at the effective display surface of the liquid crystal panel lighted by the backlight unit. In the present embodiment, the positive column light emitting portion 10a and the light extraction portion 10d substantially overlap each other.

As shown in FIGS. 1B-1D, the glass bulb 10 is approximately oval in the transverse cross section at the positive column light emitting portion 10a (light extraction portion 10d) and is approximately circular at the electrode portions 10b and 10c.

Measurement of the lamp 100 is as follows. An overall length LO of the lamp 100 is 705 mm. A length Da of the positive column light emitting portion 10a (light extraction portion 10d) along a tube axis 9 is approximately 680 mm. Lengths Db and Dc of the electrode portions 10b and 10c along the tube axis 9 are approximately 12 mm, respectively. An outer surface area of the positive column light emitting portion 10a is approximately 105 $cm^2$. A minimum outer diameter ao of the approximate oval is 4.0 mm. A minimum inner diameter ai of the approximate oval is 3.0 mm. A maximum outer diameter bo of the approximate oval is 5.8 mm. A maximum inner diameter bi of the approximate oval is 4.8 mm. Also, an outer diameter ro of the approximate circle is 5.0 mm, and an inner diameter ri of the approximate circle is 4.0 mm.

The reason why the lamp 100 of the present embodiment is in the above-described shape is as follows.

As described above, conventional lamps have a problem: if the lamp current is increased, the lamp efficiency is decreased. For example, if the lamp current is increased from a rated current 5.5 mA to 8.5 mA in a lamp that is 705 mm in the overall length, 4.0 mm in the outer diameter, and 3.0 mm in the inner diameter, the lamp efficiency is reduced from 60 (lm/W) to 50 (lm/W), approximately 83% of the original.

Such decrease of the lamp efficiency is caused by an excessive increase of the coldest-point temperature of the glass bulb caused by the increase of the lamp current. It is generally known that in lamps that are 1.2-4.0 mm in the inner diameter, if the coldest-point temperature is in the range from 60° C. to 65° C., an optimum lamp efficiency can be obtained (see "Latest Move in Fluorescent Lamps for Backlights", Shou Takagi, July, 2002, Japan Electric Lamp Manufacturers Association News letter, No. 449, page 40). It is therefore considered that the lamp efficiency decreases when the coldest-point temperature increases and exceeds the optimum range.

It is possible to solve this problem by increasing the lamp current and using a lamp that is larger in the outer and inner diameters (for example, using a lamp that is 5.0 mm in the outer diameter, and 4.0 mm in the inner diameter, not the one that is 4.0 mm in the outer diameter, and 3.0 mm in the inner diameter). This increases the outer surface area of the glass bulb, increasing the heat radiation area, contributing to suppression of the excessive increase in the coldest-point temperature.

The above-described method has a problem that if a large lamp, especially a lamp that is large in the inner diameter, is used, the distance between the center of the positive column plasma space and the inner wall of the bulb becomes large, which decreases the lamp efficiency. This will be explained more specifically. In the positive column plasma space, when mercury atom returns from the excitation state to a lower energy state, ultraviolet is released, and the released ultraviolet is absorbed by another mercury and transfers the mercury from to a higher energy state. As understood from this, ultraviolet is transmitted via mercury atom, and does not directly reach the fluorescent substance in the glass bulb. That is to say, the larger the inner diameter of the lamp is, the lower the probability that the ultraviolet, which is generated in the positive column plasma space, reaches the inner wall of the bulb, resulting in the decrease in the lamp efficiency.

Also, a lamp with a large outer diameter used for a backlight unit would be a cause of hindering the backlight unit from being made thin.

In contrast, in the present embodiment with the positive column light emitting portion 10a (light extraction portion 10d) being in the shape of an approximate oval, the outer surface area has been increased enough to suppress the excessive increase of the coldest-point temperature of the glass bulb, while substantially keeping small the distance between the center of the positive column plasma space and the inner wall of the bulb. The present embodiment accordingly keeps the lamp efficiency at a high level even if the lamp current is increased.

This will be explained in detail. As will be described later, the glass bulb 10 is formed by flattening a straight tube lamp that is 5.0 mm in the outer diameter and 4.0 mm in the inner diameter (hereinafter, a straight tube lamp with this measurement is referred to as straight tube lamp A). Accordingly, the outer surface area of the oval positive column light emitting portion 10a is approximately the same as that of the straight tube lamp A, and is larger than that of a straight tube lamp that is 4.0 mm in the outer diameter and 3.0 mm in the inner diameter (hereinafter, a straight tube lamp with this measurement is referred to as straight tube lamp B). Furthermore, the oval positive column light emitting portion 10a is 3.0 mm in the minimum inner diameter ai, and is 4.8 mm in the maximum inner diameter bi. That is to say, because the minimum inner diameter ai of the straight tube lamp A is equivalent to the inner diameter of the straight tube lamp B, the distance between the center of the positive column plasma space and the inner wall of the bulb is not substantially large.

Positive Column Load

In general, when the lamp 100 is lighted, the electrodes 10b and 10c reach relative high temperatures, and the coldest-point temperature is observed in the vicinity of the center of the positive column light emitting portion 10a along the tube axis.

The inventors of the present invention found that the coldest-point temperature depends on a value (hereinafter, this value is referred to as positive column load) that is obtained by dividing power Wp by an outer surface area Sp of the positive column light emitting portion 10a, where the power Wp represents an amount of power consumed by a positive column discharge (the power Wp is also referred to as a positive column input power Wp). This is because the heat loss corresponding to the positive column input power Wp among a lamp power W is diffused by the heat radiation and the heat conduction from the outer surface of the positive column light emitting portion 10a.

It was also found that if the positive column load is set to a range from 45 mW/cm² to 90 mW/cm², the coldest-point temperature does not exceed the optimum range. As described earlier, the optimum range of the coldest-point temperature is from 60° C. to 65° C. It was confirmed through experiment that if the positive column load is smaller than 45 mW/cm², the coldest-point temperature becomes 50° C., which is far below the optimum temperature; and if the positive column load is larger than 90 mW/cm², the coldest-point temperature becomes 75° C., which is excessively high.

It should be noted here that the positive column input power Wp is obtained by subtracting an electrode loss We from the lamp power W, which is represented as Wp=W−We. The electrode loss We is obtained by a known method, the "tube length change method". Also, the outer surface area Sp is calculated in accordance with Sp=π(ao+bo)Da/2 (see FIG. 1). In the case of the lamp 100 in the present embodiment, the positive column input power Wp is 7.8 W (lamp current 8.5 mA) and the outer surface area is 105 cm², and therefore the positive column load is 74 mW/cm².

Glass Bulb Formation Method

FIGS. 2A-2D show how the glass bulb 10 of the lamp 100 is formed.

Figure 2A:
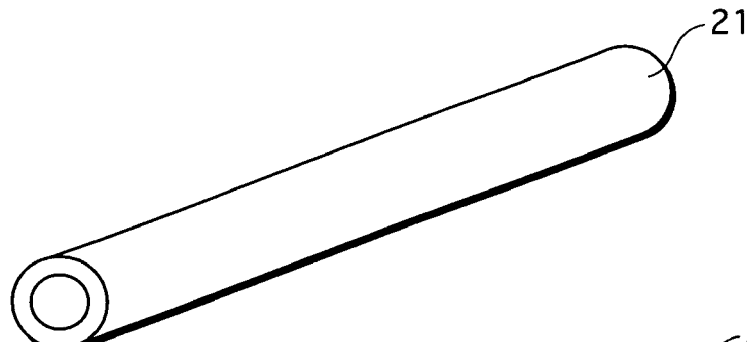
FIGS. 2A-2D show how the glass bulb is formed.
Figure 2B:
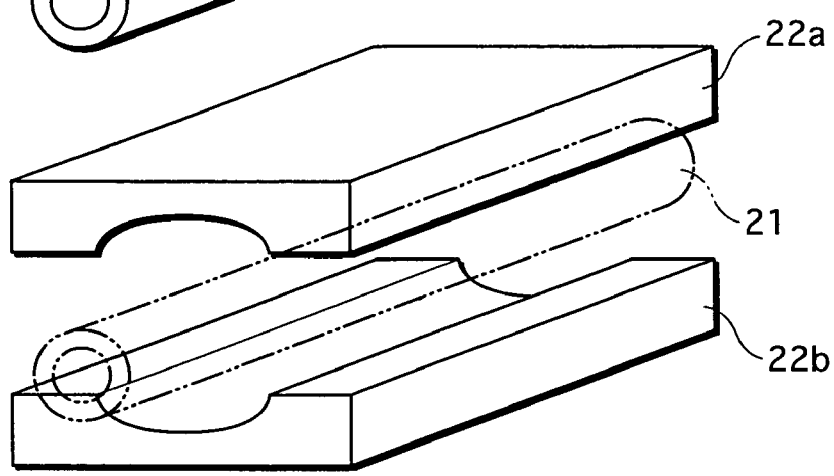
Figure 2C:
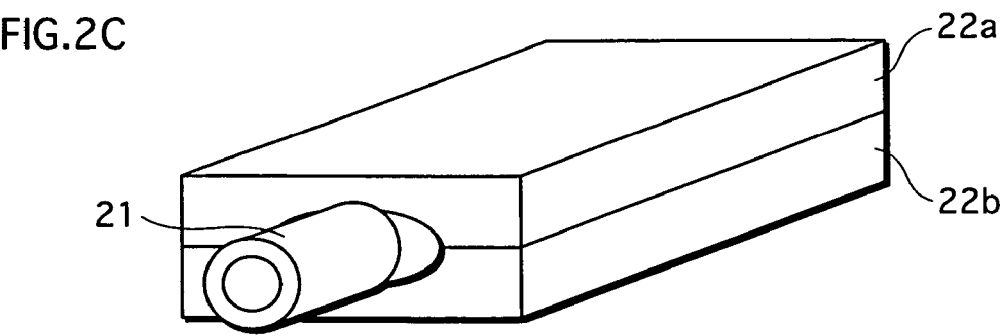
Figure 2D:
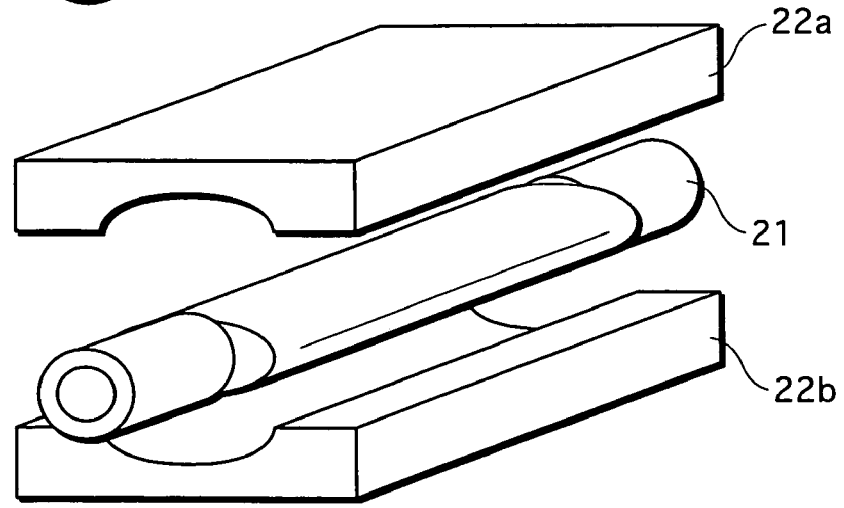

In Step (a), as shown in FIG. 2A, a straight glass bulb 21 made of borosilicate glass (the softening point is 765° C.) is prepared. In Step (b), as shown in FIG. 2B, the glass bulb 21 is set so that a portion thereof that is to be flattened is sandwiched by jig plates 22a and 22b made of stainless steel. In Step (c), as shown in FIG. 2C, the glass bulb 21 is heated by a heating furnace (not illustrated) to a tube temperature (for example, a temperature in a range from 620° C. to 700° C.) lower than the softening point, so that the sandwiched portion is flattened by the weight of the jig plate 22a. In Step (d), as shown in FIG. 2D, by removing the jig plates 22a and 22b, obtained is the glass bulb 21 whose specific portion having been deformed as desired from an approximate circle to an approximate oval in the transverse cross section.

The method of forming the glass bulb is not limited to the above-described method.

The glass bulb 10 of the present embodiment is formed by subjecting the straight tube lamp A (the outer and inner diameters are respectively 5.0 mm and 4.0 mm) to the above-described steps (b) to (d). Through these steps, the shape, in the transverse cross section, of an approximate circle with the outer diameter of 5.0 mm and the inner diameter of 4.0 mm is changed to an approximate oval with the maximum outer diameter of 5.8 mm, the minimum outer diameter of 4.0 mm, the maximum inner diameter of 4.8 mm, and the minimum inner diameter of 3.0 mm. It should be noted here that in the case of flattening the straight tube lamp A with the outer diameter of 5.0 mm by the above-described formation method, it is desirable that the settings are made so that in the deformed glass bulb, the maximum outer diameter bo is 6.6 mm and the minimum outer diameter ao is 3.0 mm at the largest (the ellipticity in this case is ao/bo≈0.45). This is because if the tube is excessively flattened, the tube greatly changes in thickness, decreasing the yield.

Backlight Unit

Figure 4:
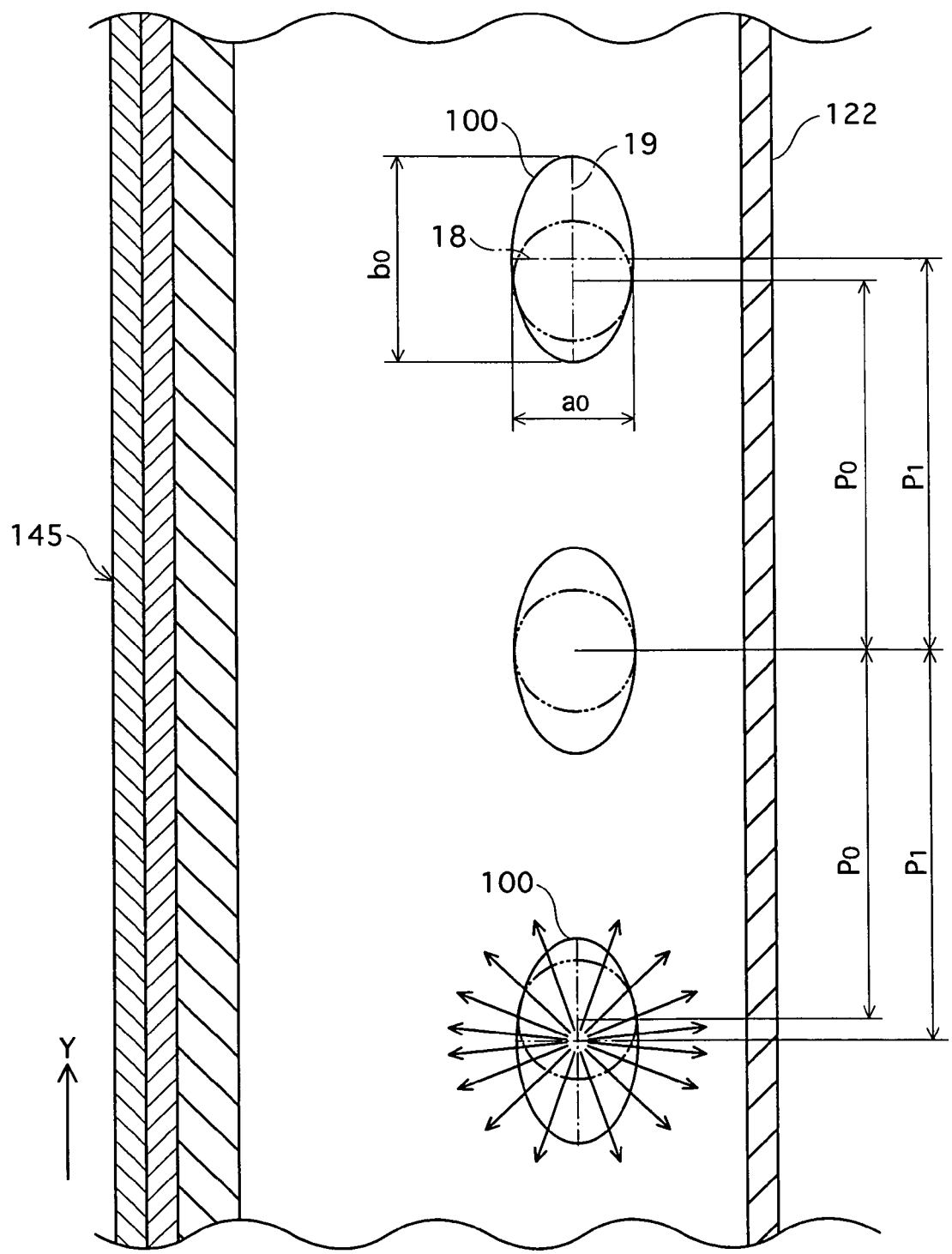
FIG. 4 is an enlarged cross-sectional view of a portion, which is the center of length along the X axis, of the backlight unit shown in FIG. 3, taken transversely along the Y axis.

FIG. 3 is a perspective view of a backlight unit 1000 for a 32-inch liquid crystal television (the aspect ratio is 16:9). In FIG. 3, a diffusion plate 140, a diffusion sheet 142, and a lens sheet 144 are cut away to show the construction inside. FIG. 4 is an enlarged cross-sectional view of a portion, which is the center of length along the X axis, of the backlight unit 1000 shown in FIG. 3, taken transversely along the Y axis. It should be noted here that in FIG. 4, in terms of the lamp 100, only its outer diameter is shown. Also, each circle drawn by a chain double-dashed line indicates the outer diameter of the straight tube lamp B that is 4.0 mm in the outer diameter and 3.0 mm in the inner diameter. Also, FIG. 4 is drawn to indicate for the sake of convenience that the center of the straight tube lamp B, which is the second one from the top, matches the center of the lamp 100.

The backlight unit 1000, which is of the direct-below type, has an outer container 120 composed of a rectangular reflection plate (bottom plate) 122 and side plates 124 surrounding the bottom plate, and inside the outer container 120, 14 lamps 100 are arranged in parallel at substantially regular intervals.

The outer container 120 is made of, for example, polyethylene terephthalate (PET). A metal such as silver is vapordeposited on the inner surfaces of the outer container 120 (that is, inner surfaces of the reflection plate and the side plates 124) to form reflection surfaces. The inner measurement of the container 120 is as follows. The length in the horizontal direction (X-axis direction) is 728 mm. The length in the vertical direction (Y-axis direction) is 408 mm. The outer depth is 19 mm, indicating that the container 120 is thin. The main surface (inner surface) of the reflection plate 122 is 14 mm away from the inner surface of a front panel 145. The lamps 100 are arranged close the reflection plate 122 with a lamp pitch (a distance between adjacent lamps) $P_1$.

The front opening of the container 120 is covered with a front panel 145 having translucency that is a lamination of the diffusion plate 140, diffusion sheet 142, and lens sheet 144. The container 120 is hermetically sealed to prevent dust or the like from coming into it and destroying the lamps 100 or the like.

The diffusion plate 140 and diffusion sheet 142 are provided to scatter and diffuse the light radiated from the lamps 100. The lens sheet 144 is provided to turn the light in the normal direction of the lens sheet 144. These elements are constructed so that the light emitted from the lamps 100 goes forward and evenly illuminates the whole surface (light emitting surface) of the front panel 145.

As described above, the outer container 120 is hermetically sealed, and therefore the coldest-point temperature is apt to increase excessively. However, by using the lamps 100 of the present invention, it is possible to effectively prevent the coldest-point temperature from increasing excessively. This makes it possible to increase the amount of gained light flux as much as the lamp current increases.

In the present embodiment, the lamps 100 are arranged so that a long axis 19 of an approximate oval in the transverse cross section is substantially in parallel with the main surface of the reflection plate 122. This arrangement provides the following advantageous effects.

First, since the minimum outer diameter ao (4.0 mm) of the approximate oval of the lamp 100 is equal to the outer diameter of the straight tube lamp B, it is possible to prevent occurrence of the wavy uneven brightness even if the lamps 100 are provided in the outer container 120 that has been designed for the straight tube lamp B.

Secondly, uneven brightness may occur if the distance between the lamp sand the reflection plate is too close. However, the distance between the lamps 100 and the reflection plate 122 is the same as that in the case where the straight tube lamps B are used as the lamps. This also indicates that the outer container 120 can be kept thin.

Thirdly, since the maximum outer diameter bo of the approximate oval (5.8 mm) is longer than the outer diameter of the straight tube lamp B (4.0 mm), if the lamp pitch is appropriately set to be larger than a conventional lamp pitch $P_0$, the setting does not low brightness at positions between the lamps 100 on the light emitting surface, thus preventing an uneven brightness from being caused. That is to say, it is possible to set the lamp pitch $P_1$ to be larger than the conventional lamp pitch $P_0$, when the lamps are arranged in the outer container 120 of the same size in both horizontal and vertical directions. This reduces the number of lamps to be used, which contributes to the cost reduction.

Furthermore, as indicated by the solid-line arrows in the third lamp 100 from the top in FIG. 4, a larger amount of light is emitted in the direction of the long axis 19 than in the direction of the short axis 18. Accordingly, when the lamps 100 are arranged so that the long axis 19 is substantially in parallel with the reflection plate 122, the light emitted from the lamps can be directed forward (toward the light emitting surface) and backward (toward the reflection plate 122). This increases the efficiency in effectively using the light flux radiated form the lamps 100, and improves the brightness at the light emitting surface.

Measurement Experiments Lamp Efficiency and Backlight Brightness

Experiments were conducted to measure the lamp efficiency and the brightness at the center of the light-emitting surface of the backlight unit in comparison between the cases where the conventional straight-tube type lamps and the lamps 100 of the present embodiment are arranged and in the outer container 120 of the backlight unit 1000. FIG. 5 shows the measurement results of the experiments. It should be noted here that in the boxes for the lamp 100 for the "inner diameter" and "outer diameter" columns of FIG. 5, values are provided in the order of minimum inner diameter, maximum inner diameter, minimum outer diameter, and maximum outer diameter.

Straight Tube Lamp B

First, 16 straight tube lamps B were arranged in the outer container 120 with 25.7 mm of the lamp pitch (It should be noted here that the distance between the top lamp and a side plate 124 and the distance between the bottom lamp and a side plate 124 is approximately half the lamp pitch. This also applies to the other experiments with the other types of lamps). The backlight unit 1000 was then operated with 5.5 mA of the lamp current flown in each lamp. The lamp efficiency of a lamp, which is in the vicinity of the center of length of the reflection plate in the vertical direction (Y axis), was measured. According to the measurement, the lamp efficiency was approximately 60 (lm/W). Also, the brightness at the center of the front panel surface 145 was approximately 8000 (cd/m$^2$)

Straight Tube Lamp A

Secondly, 15 straight tube lamps A were arranged in the outer container 120 with 27.2 mm of the lamp pitch. The backlight unit 1000 was then operated with 8.5 mA of the lamp current flown in each lamp. The lamp efficiency was approximately 55 (lm/W). Also, the brightness was approximately 9500 (cd/m$^2$). The brightness is higher than the case of the straight tube lamps B, but wavy, uneven brightness was observed with approximately 6% of the rate of variability.

Lamp 100

Thirdly, 14 lamps 100 of the present embodiment were arranged in the outer container 120 with 29.0 mm of the lamp pitch. The backlight unit 1000 was then operated with 8.5 mA of the lamp current flown in each lamp. The lamp efficiency was approximately 65 (lm/W). The observed lamp efficiency for the sample of the present embodiment is higher than the case of the straight tube lamps B (5.5 mA of the lamp current) by approximately 8%, and higher than the case of the straight tube lamps A by approximately 18%. Also, the brightness in the vicinity of the center of the front panel surface was as high as approximately 11400 (cd/m$^2$).

The wavy, uneven brightness was not observed in terms of the sample of the present embodiment. Although the lamp pitch of the present sample (29.0 mm) is larger than that of the straight tube lamps B (25.7 mm), and the number of lamps of the present sample (14) is smaller than that of the straight tube lamps B (16), the uneven brightness due to reduced brightness was not observed at places between lamps on the front panel surface.

Modification 1

It is preferable that the entire positive column light emitting portion 10a is approximately oval in the transverse cross section, as in the present embodiment, to suppress the excessive increase of the coldest-point temperature of the glass bulb, and to substantially reduce the distance between the center of the positive column plasma space and the inner wall of the bulb. The above-described advantageous effect is obtained to some extent if the most part of the positive column light emitting portion 10a is approximately oval in the transverse cross section and the remaining portion is approximately circular.

Figure 6:
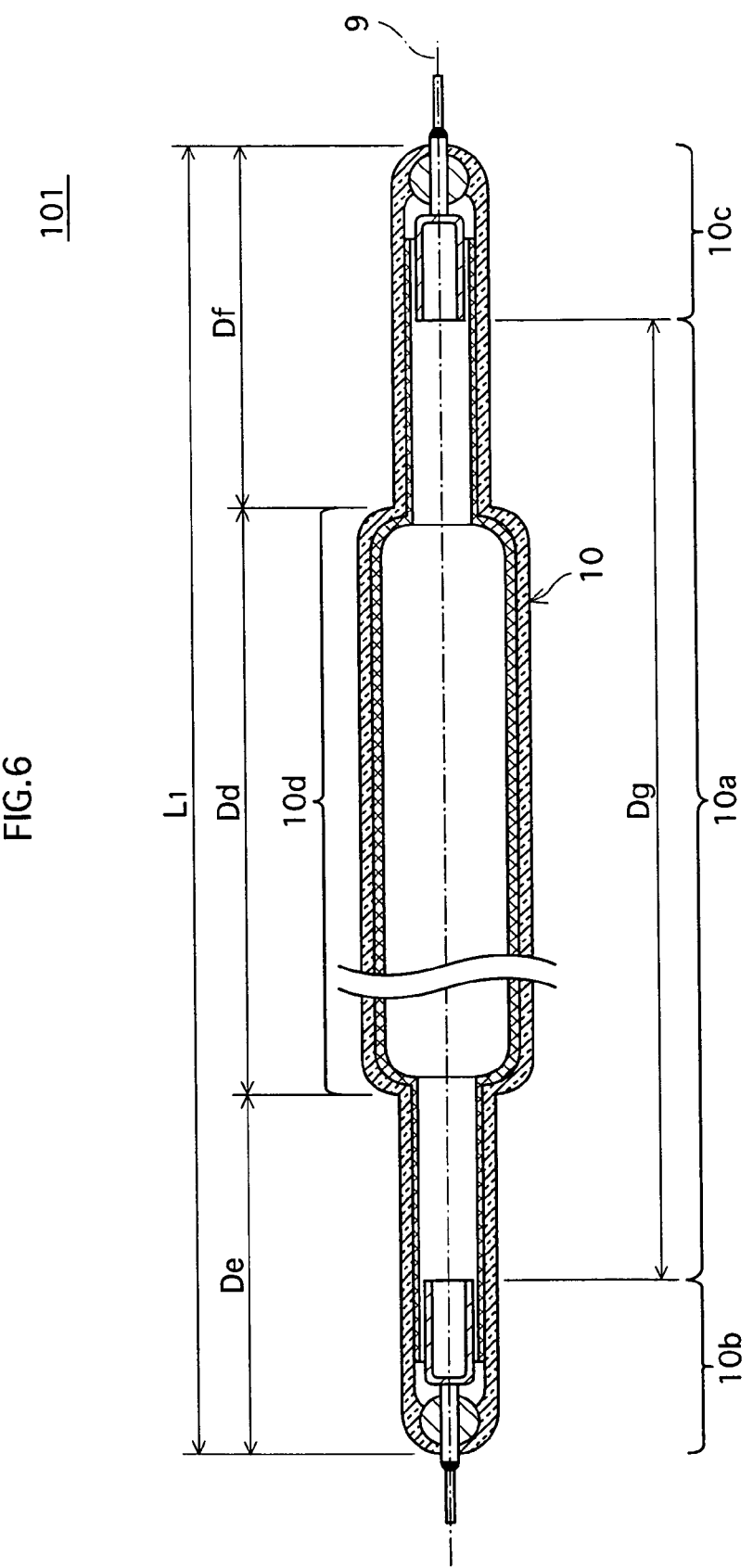
FIG. 6 shows a modification of Embodiment 1.

FIG. 6 shows Modification 1.

As shown in FIG. 6, the light extraction portion 10d among the positive column light emitting portion 10a is approximately oval in the transverse cross section, and the remaining portion of the positive column light emitting portion 10a and the electrode portions 10b and 10c is approximately circular in the transverse cross section.

Measurement of a lamp 101 shown in FIG. 6 is as follows. An overall length L1 of the lamp 101 is 405 mm. Lengths Db and Dc (see FIG. 1) of the electrode portions 10b and 10c are approximately 12 mm, respectively. A length Dg of the positive column light emitting portion 10a is approximately 380 mm. A length Dd of the light extraction portion 10d, which is approximately oval in the transverse cross section, among the positive column light emitting portion 10a is approximately 340 mm. The length of the remaining portion, which is approximately circular in the transverse cross section, of the positive column light emitting portion 10a is approximately 20 mm.

As explained above, in the lamp 101, the light extraction portion 10d is shorter than the positive column light emitting portion 10a. This is because, for example, when the lamp is used in a backlight unit for a LCD apparatus, since horizontal length (in the lamp longitudinal direction) of the effective display surface of the LCD panel is greatly smaller than that of the light-emitting surface of the backlight unit, the light from both ends of the lamps is not much required for the light emission on the effective display surface of the LCD panel.

Also, it was confirmed through experiments that to increase the lamp efficiency by substantially reducing the distance between the center of the positive column plasma space and the inner wall of the bulb, the length of the light extraction portion 10d, which is approximately oval in the transverse cross section, needs to be longer than the length of half the remaining portion and the electrode portion 10b or 10c (De<Dd>Df) . Also, since the coldest-point temperature of the glass bulb is formed in the vicinity of the center of the positive column light emitting portion 10a, it is desired that at least the vicinity of the center of the positive column light emitting portion 10a is approximately oval in the transverse cross section.

Modification 2

In the above description of the present embodiment, the positive column light emitting portion is approximately oval in the transverse cross section. However, the transverse cross section shape is not limited to the approximate oval, but may be any flat shape.

Figure 7:
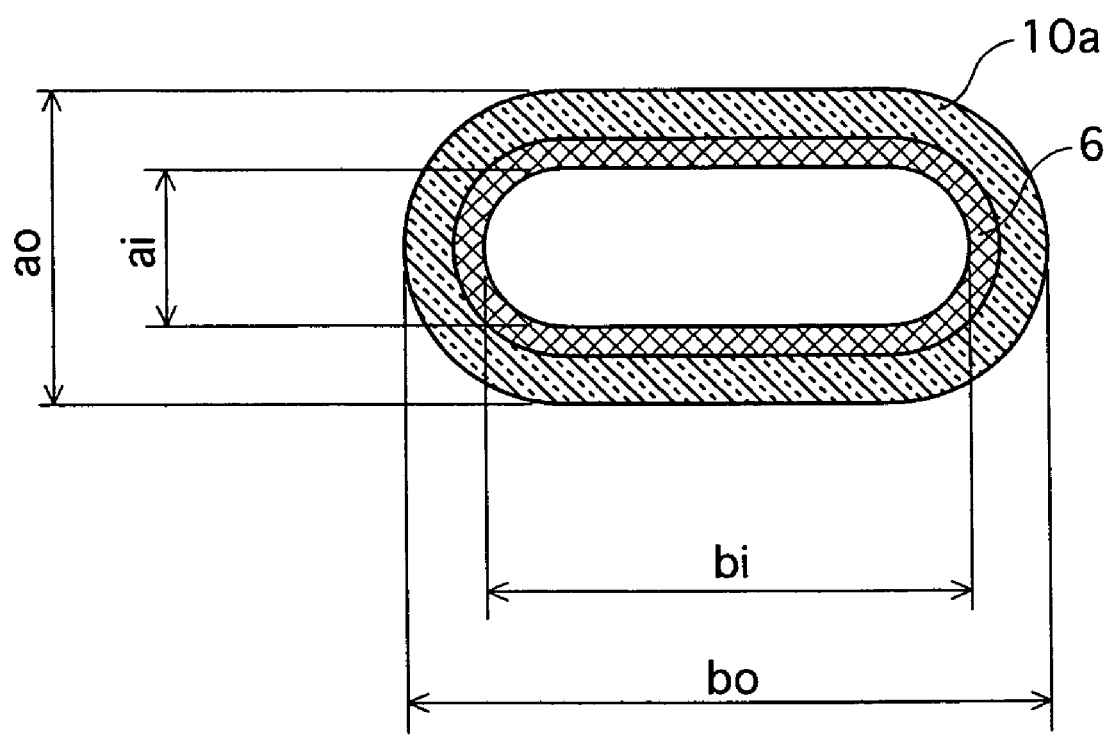
FIG. 7 shows a modification of Embodiment 1.

FIG. 7 shows one example of such modifications.

As shown in FIG. 7, the positive column light emitting portion 10a is approximately rectangular (a shape of a competition circuit) in the transverse cross section, with straight lines extending in parallel with the maximum inner diameter bi and the maximum outer diameter bo.

The advantageous effect of the present invention can also be obtained when the positive column light emitting portion 10a is approximately rectangular in the transverse cross section.

Others

1. In the above description of the present embodiment, hollow-type electrodes are used. However, bar-like electrodes may be used instead. Also, in the present embodiment, the electrodes are approximate circular in the transverse cross section. However, they may be approximately oval in the transverse cross section. Namely, the whole glass bulb may be flat in the transverse cross section, with the electrodes being flat, as well.

Also, when both the electrodes of the glass bulb and the hollow-type electrodes are made flat in the transverse cross section, it highly costs to set the distance between the inner surface of the glass bulb and the outer surface of the electrodes to be highly accurate (for example 0.2 mm or smaller). This is because for that purpose, both the glass bulb and the electrodes must be approximately in the same shape in the transverse cross section, which is difficult in production. In contrast, if both the electrodes of the glass bulb and the hollow-type electrodes are approximately circular in the transverse cross section, such highly accurate setting is possible by adjusting the diameter of both elements. This arrangement is preferable since it is easier to produce.

2. It is preferable that the minimum inner diameter of the flat shape is 3.0 mm or smaller. This is because it has been confirmed through experiments that if the minimum inner diameter is larger than 3.0 mm, the distance between the center of the positive column plasma space and the inner wall of the bulb becomes large, which decreases the lamp efficiency drastically. It is further preferable that the minimum inner diameter of the flat shape in the transverse cross section is 2.5 mm or smaller. This is because it has been confirmed that the lamp efficiency measured with the lamp current 8.5 mA for the lamp, in which the minimum inner diameter ai is 2.5 mm, the minimum outer diameter ao is 3.5 mm, the maximum inner diameter bi is 5.4 mm, and the maximum outer diameter bo is 6.4 mm, and otherwise constructed the same as shown in FIG. 1, is higher that measured with the lamp current 5.5 mA for the straight tube lamp B by approximately 10%.

The lower limit of the minimum inner diameter is, for example, 1.0 mm. This is because it is difficult to form the portion with 1.0 mm or less of the minimum inner diameter.

The cold-cathode fluorescent lamp of the present invention is applicable to backlight units or the like since it increases the amount of gained light flux as much as the lamp current increases.

Embodiment 2

As described earlier, the glass bulb of the cold-cathode fluorescent lamp is filled with a rare gas and a small amount of mercury. The rare gas is enclosed mainly for the purpose of decreasing the sparkover voltage. Conventionally, only argon was enclosed as the rare gas.

However, as the LCD apparatus including the backlight unit was more and more compact, the demand for more compact power unit for driving the cold-cathode fluorescent lamp was increased. And therefore, further reduction of the sparkover voltage was required. To meet the demand, a cold-cathode fluorescent lamp that is filled mainly with neon and argon as the rare gas was developed (see Japanese Patent Publications No. 3141411 and No. 3068659).

Figure 8A:
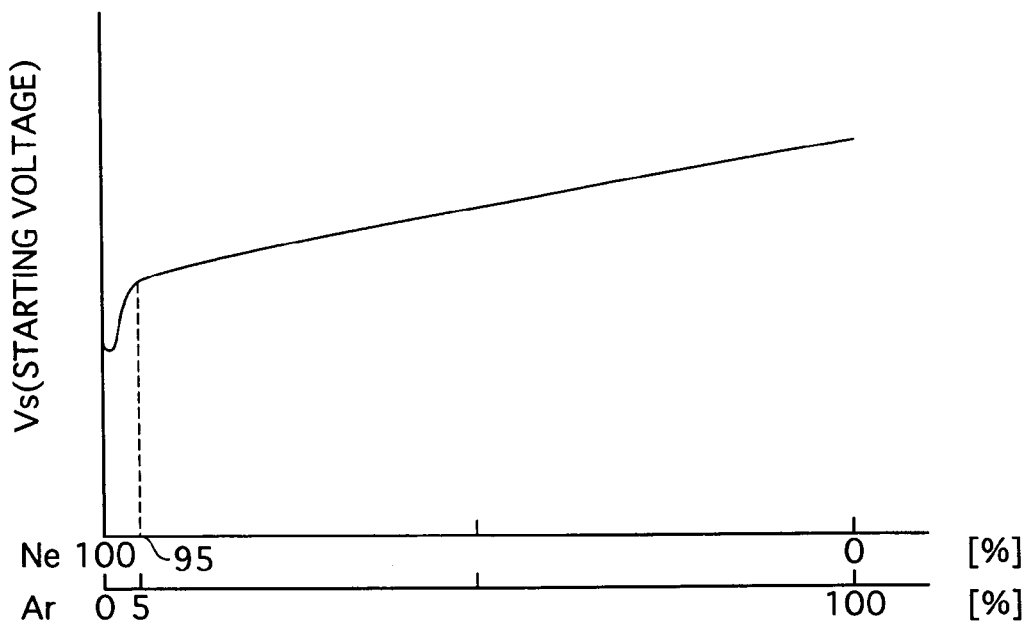
FIGS. 8A and 8B are plots of data for a cold-cathode fluorescent lamp that is filled with a mix gas of mainly neon and argon, where

The inventors of the present invention also performed an experiment regarding the starting voltage characteristics with varying molar ratio between enclosed neon and argon. FIG. 8A shows the results of the experiment. FIG. 8A is a plot of the molar ratio (%) between neon (Ne) and argon (Ar) to the right and the starting voltage vertically. It should be noted here that FIG. 8A only shows the tendency of the change of the starting voltage in correspondence with the mix ratio of rare gases, and does not show absolute values, for example.

As shown in FIG. 8A, as the ratio of neon is increased starting with only argon (100%) (that is, as the ratio of argon is decreased), the starting voltage gradually decreases. It is understood from FIG. 8 that to improve only the starting voltage, it is preferable that the rare gas to be enclosed is close to only neon (100%).

Figure 8B:
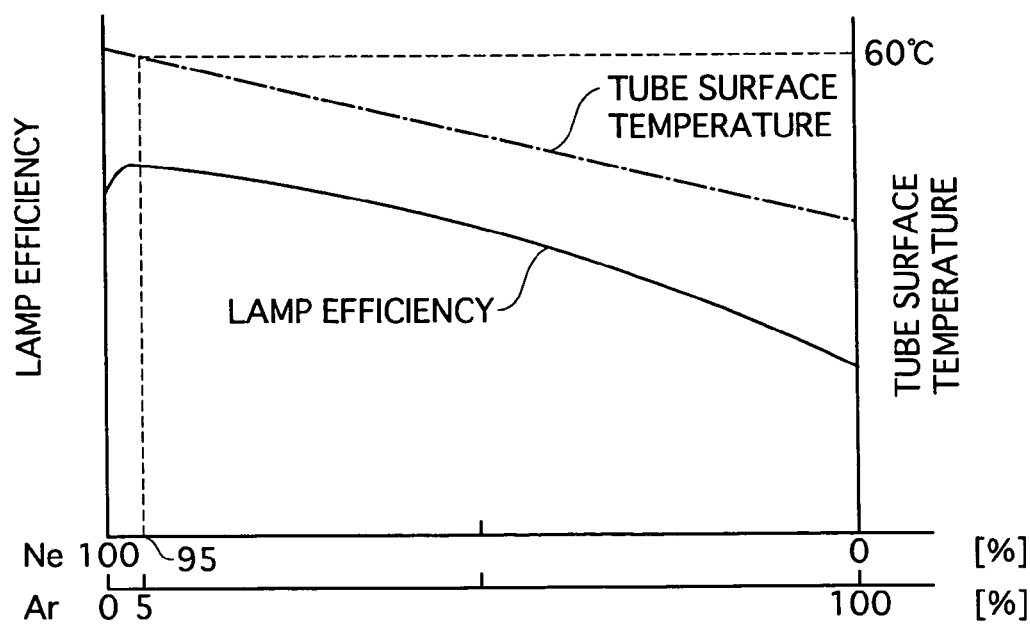

It has been confirmed through experiment however that if the rare gas to be enclosed is close to only neon (100%), the lamp efficiency is decreased. FIG. 8B is a plot of the mix ratio between neon and argon to the right and the lamp efficiency vertically. As understood from FIG. 8B, as the ratio of argon is decreased, the lamp efficiency gradually increases to a peak when argon 5% and neon 95% and then decreases. This is because when the mix ratio is neon 95% and argon 5%, the glass bulb surface temperature (Ts) becomes 60° C. at which the optimum mercury vapor pressure is obtained.

The optimum mix ratio is therefore considered to be neon 95%-argon 5%, since with the mix ratio, compared with the case of only argon, the starting voltage is improved and the lamp efficiency is improved.

Meanwhile, as the liquid crystal televisions become larger in scale and higher in brightness, the number of cold-cathode fluorescent lamps attached to each backlight unit of the direct-below type attached to a LCD panel for such liquid crystal televisions increases. As the number of cold-cathode fluorescent lamps increases, the temperature in the unit also rises up to near 70° C., exceeding 60° C. at which the optimum mercury vapor pressure is obtained. This results in reduction of the lamp efficiency to a level at which necessary brightness cannot be obtained.

To prevent the lamp efficiency from being reduced due to the increase of temperature in the unit, the ratio of argon may be increased to be more than 5% to decrease the glass bulb surface temperature. It is possible with this arrangement to decrease the temperature in the unit to near 60° C. However, as understood from FIG. 8A, this causes the starting voltage to increase. Such a high starting voltage becomes a problem for a range of temperatures at which the liquid crystal television is used, especially at a low temperature (for example, 0° C.) at which the mercury vapor pressure becomes low.

The present embodiment provides a cold-cathode fluorescent lamp that has been improved in both the lamp efficiency and the starting voltage (especially, the starting voltage at a low temperature), compared with a fluorescent lamp for which a mix rare gas of mainly neon and argon is used.

Figure 9A:
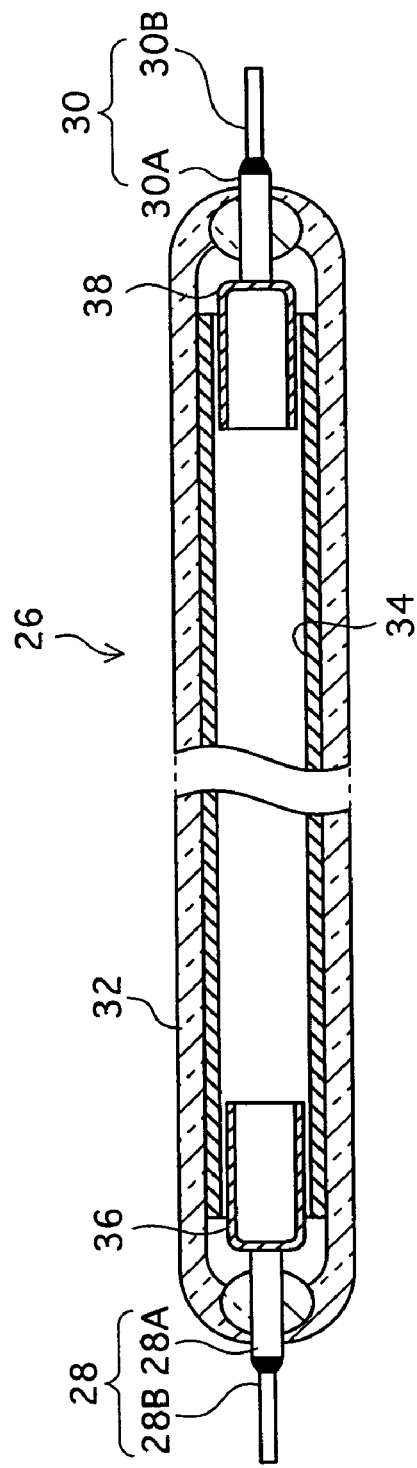
FIGS. 9A and 9B are longitudinal are cross-sectional views of a cold-cathode fluorescent lamp in Embodiment 2.

FIG. 9A is a longitudinal cross-sectional view taken along the length of a lamp 26 in the present embodiment, showing an outline construction thereof.

The lamp 26 includes a glass bulb 32 that is approximately circular in the transverse cross section, and is hermetically sealed by lead wires 28 and 30 at both ends. The glass bulb 32 is made of hard borosilicate glass, with its overall length being 450 mm, the outer diameter 4.0 mm, and the inner diameter 3.0 mm.

On the inner surface of the glass bulb 32, a fluorescent film 34 is formed. The fluorescent film 34 includes three rare-earth fluorescent substances: red fluorescent substance ($Y_2O_3$: $Eu^{3+}$); green fluorescent substance ($LaPO_4$: $Ce^{3+}$, $Tb^{3+}$); and blue fluorescent substance ($BaMg_2Al_{16}O_{27}$: $Eu^{2+}$)

The 32 is filled with mercury (not illustrated) of approximately 3 mg and a mix gas of a plurality of rare gases. The gases contained in the mix gas and the mix ratio will be described in detail later.

The lead wire 28 is formed by linking an inner lead wire 28A made of tungsten with an outer lead wire 28B made of nickel, and the lead wire 30 is formed by linking an inner lead wire 30A made of tungsten with an outer lead wire 30B made of nickel. The glass bulb is hermetically sealed by the inner lead wires 28A and 30A at both ends. The inner lead wires 28A and 30A and the outer lead wires 30B and 30B are circular in the transverse cross section, respectively. The inner lead wires 28A and 30A are 1 mm in the diameter, with their overall length being 3 mm, respectively. The outer lead wires 28B and 30B are 0.8 mm in the diameter, with their overall length being 10 mm, respectively.

The inner lead wires 28A and 30A are supported by the ends of the glass bulb 32, respectively. Electrode 36 is joined by, for example, laser welding, with an end of the inner lead wire 28A located inside the glass bulb 32. Electrode 38 is joined by, for example, laser welding, with an end of the inner lead wire 30A located inside the glass bulb 32. The electrodes 36 and 38 are what is called hollow type which is in the shape of a cylinder with a bottom. The electrodes 36 and 38 are made of niobium bars. The reason why the hollow type is adopted for the electrodes 36 and 38 is that the hollow type is effective in suppressing the sputtering at electrodes caused by the discharge when the lamp is lighted (for detail, see, for example, Japanese Laid-Open Patent Application No. 2002-289138).

Figure 9B:
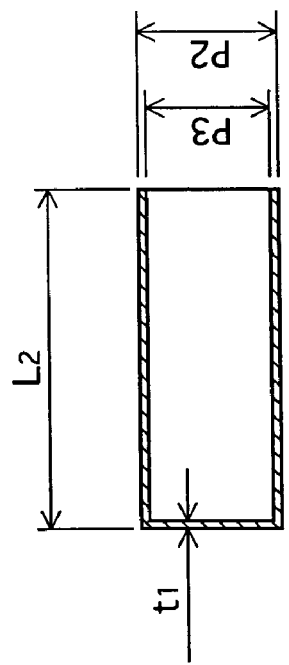

The electrodes 36 and 38 are in the same shape. The measurement of the portions shown in FIG. 9B is as follows: An electrode length $L2=5.2$ mm; an outer diameter $p2=2.7$ mm; and thickness $t1=0.2$ mm (inner diameter $p3=2.3$ mm). The electrodes 36 and 38 are disposed so that the center thereof is the tube axis of the glass bulb 32. It is understood from the above-described measurement that the distance between the outer surface of the electrodes 36 and 38 and the inner surface of the glass bulb 32 is approximately 0.15 mm. Such a small distance is set to prevent the lamp current from flowing into the space between the outer surface of the electrodes 36 and 38 and the inner surface of the glass bulb 32. In other words, with this arrangement, when the lamp is lighted, discharge occurs only inside the hollow electrodes 36 and 38 (occurs at the inner side and bottom surfaces of the cylinder-shaped electrodes).

The inventors of the present invention conducted an experiment for the above-constructed cold-cathode fluorescent lamp in terms of the starting voltage or the like, for comparing each of the samples with mix gases of neon (Ne)+argon (Ar)+krypton (Kr) and neon (Ne)+krypton (Kr) with a conventional mix gas of neon (Ne)+argon (Ar) that are enclosed in the glass bulb. The following describes the experiment conditions and results for each mix gas.

[1] Neon (Ne)+Argon (Ar)+Krypton (Kr)

An experiment was conducted in terms of the starting voltage for comparing the mix gas of neon (Ne)+argon (Ar)+krypton (Kr) (hereinafter referred to as "type D") with the conventional mix gas of neon (Ne) 95% and argon (Ar) 5% (hereinafter referred to as "type C"). It should be noted here that in the present embodiment, the mix ratio (%) of the mix gas is represented by a molar ratio. Regarding the type D, five types of different mix ratios using the three rare gases were prepared. The five types are identified by the signs D-1, D-2, ... D-5. Detailed mix ratios will be described later.

For each of the type C and the types D-1 to D-5, five samples for each of the gas pressure 40 Torr (5320 Pa), 50 Torr (6650 Pa), and 60 Torr (7980 Pa) were prepared. The starting voltage was measured for each sample at ambient temperature 0° C. and at ambient temperature 25° C.

FIGS. 10-15 show the measurement results.

Figure 16:
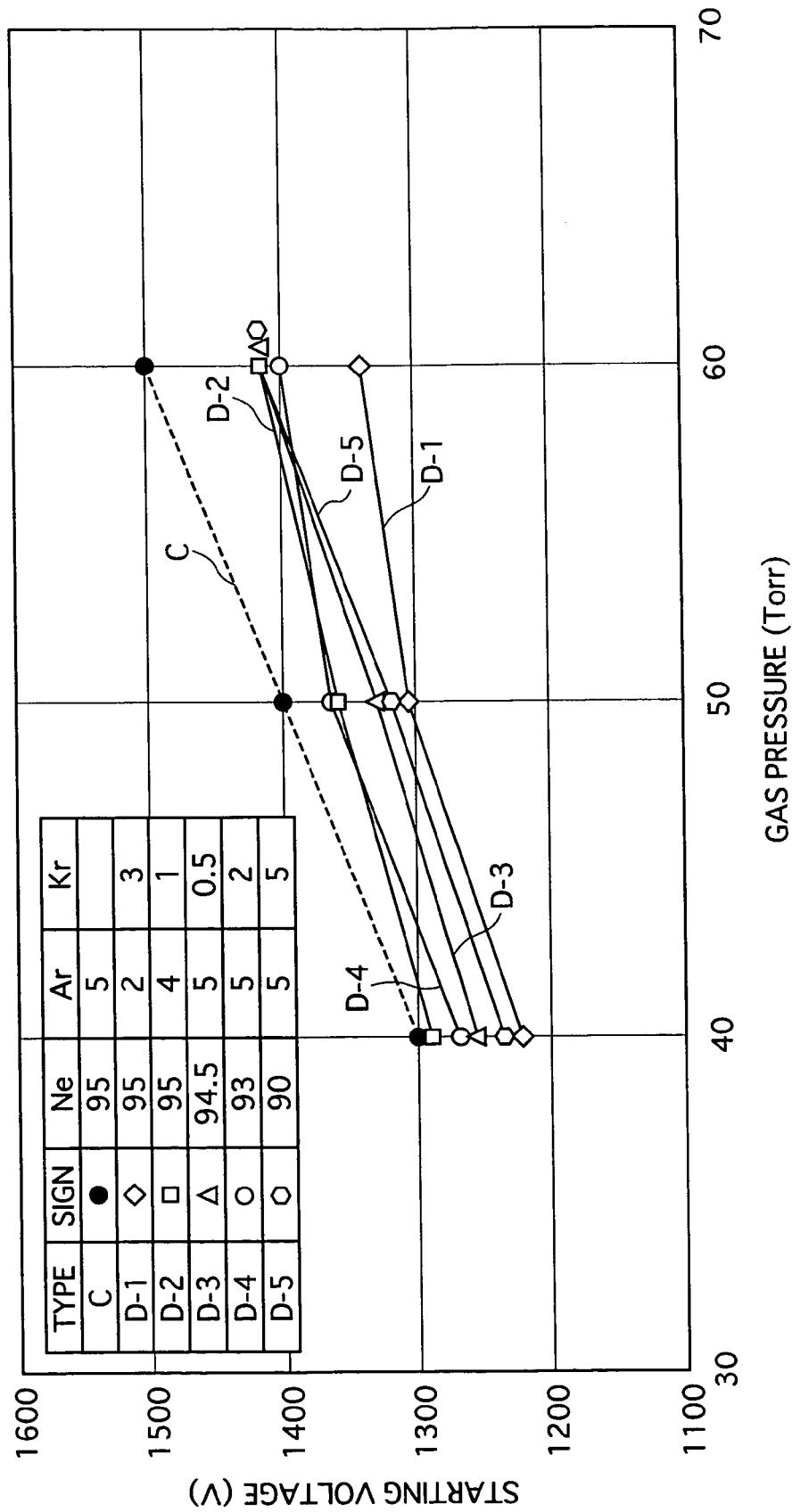
FIG. 16 is a plot of gas pressure versus starting voltage at ambient temperature 0° C. for various types of rare gases with various mix ratios.

FIG. 16 is a graph that was made based on the data of the experiment results for the ambient temperature 0° C. shown in FIGS. 10-15. The mix ratios of the types D-1 to D-5 are shown in the upper left corner of FIG. 16. It should be noted here that in FIG. 16, the arithmetic average of the five measurement results values (No. 1-5) is used for the sake of convenience, instead of showing all the five values.

As shown in FIG. 16, in an environment of the ambient temperature 0° C. and any of the gas pressures, the starting voltage of the lamps of types D-1 to D-5 is lower than that of the conventional type-C lamp. That is to say, it was found that the starting voltage at a low temperature (0° C.) is decreased when a mix gas of neon, argon and krypton, which is made by adding krypton to the conventional type-C mix gas of neon and argon, is used.

Figure 17:
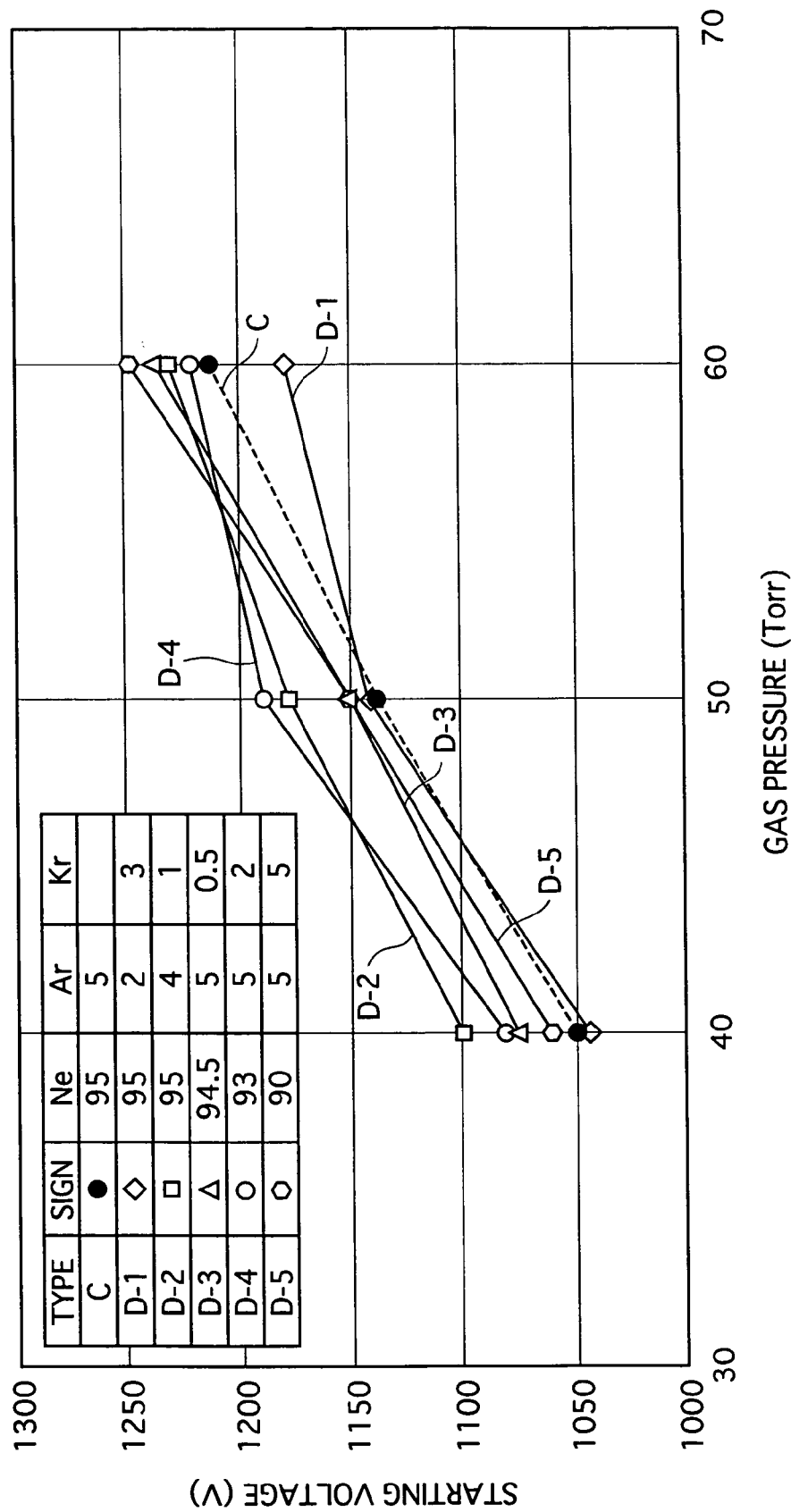
FIG. 17 is a plot of gas pressure versus starting voltage at ambient temperature 25° C. for various types of rare gases with various mix ratios.

FIG. 17 is a graph that was made based on the data of the experiment results for the ambient temperature 25° C. shown in FIGS. 10-15.

As shown in FIG. 17, except for 60 Torr of gas pressure at which the starting voltage of the type-D-1 lamp is lower than that of the conventional type-C lamp, the starting voltage of the type-D lamps is equal to or higher than that of the conventional type-C lamp. However, the starting voltage of the type-D lamps is approximately 1250 V at the highest, which is of the type-D-5 lamp at 60 Torr of gas pressure. The value 1250 V is lower than the approximate 1300 V that is the lowest starting voltage of the conventional type-C lamp at the ambient temperature 0° C. (see FIG. 3). That is to say, it was found that use of the type-D mix gas improves the starting voltage in terms of the operation of the liquid crystal display apparatus at the severest temperature environment. This contributes to achievement of a small-scale power circuit.

[2] Neon (Ne)+Krypton (Kr)

An experiment was conducted in terms of the starting voltage for comparing the mix gas of neon (Ne) 95%+krypton (Kr) 5% (hereinafter referred to as "type E") with the conventional type-C mix gas. The experiment was conducted under the same conditions as the above-described experiment for type-D mix gas.

FIG. 18 shows the measurement results of this experiment.

Figure 19:
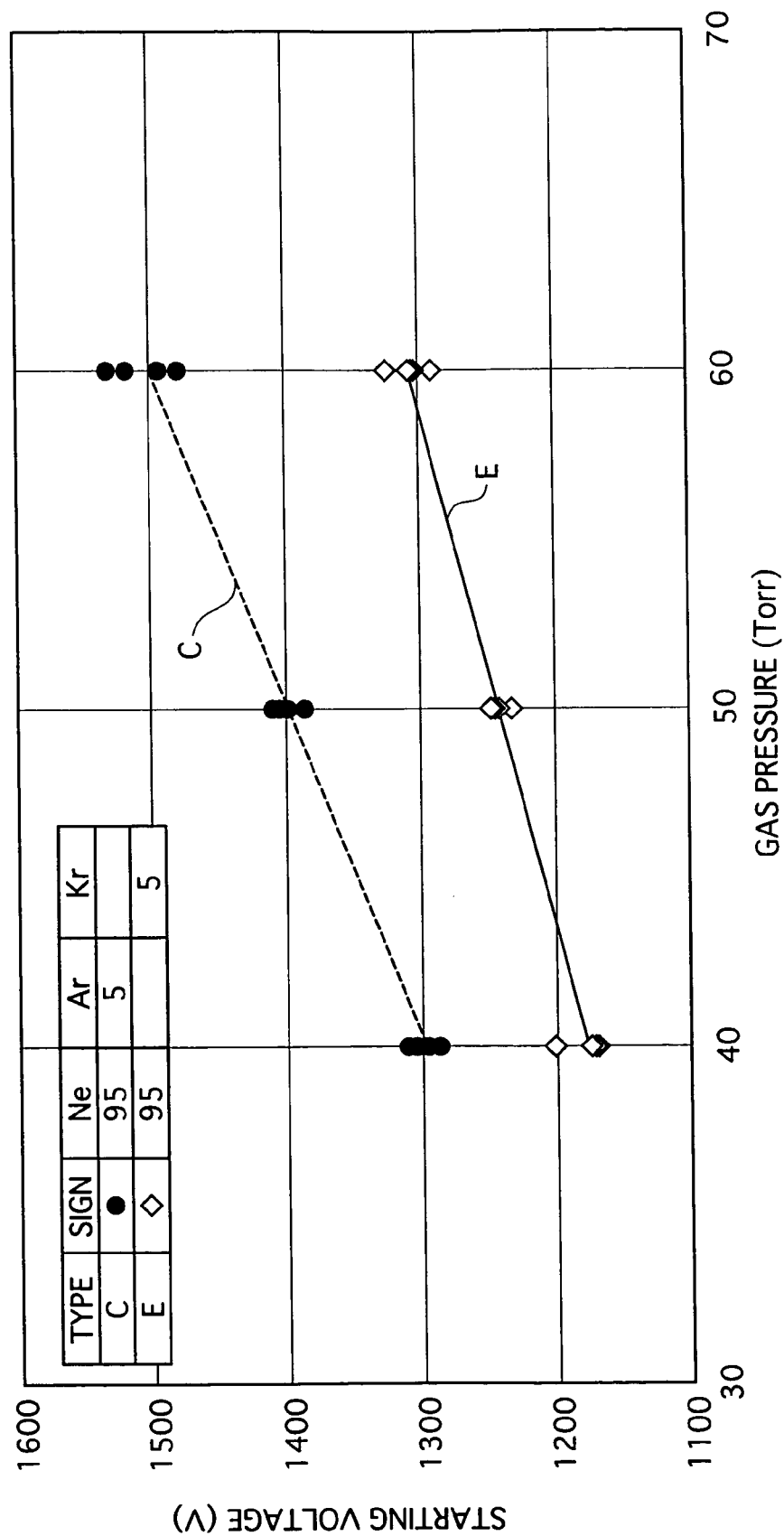
FIG. 19 is a plot of gas pressure versus starting voltage at ambient temperature 0° C. for various types of rare gases with various mix ratios.
Figure 20:
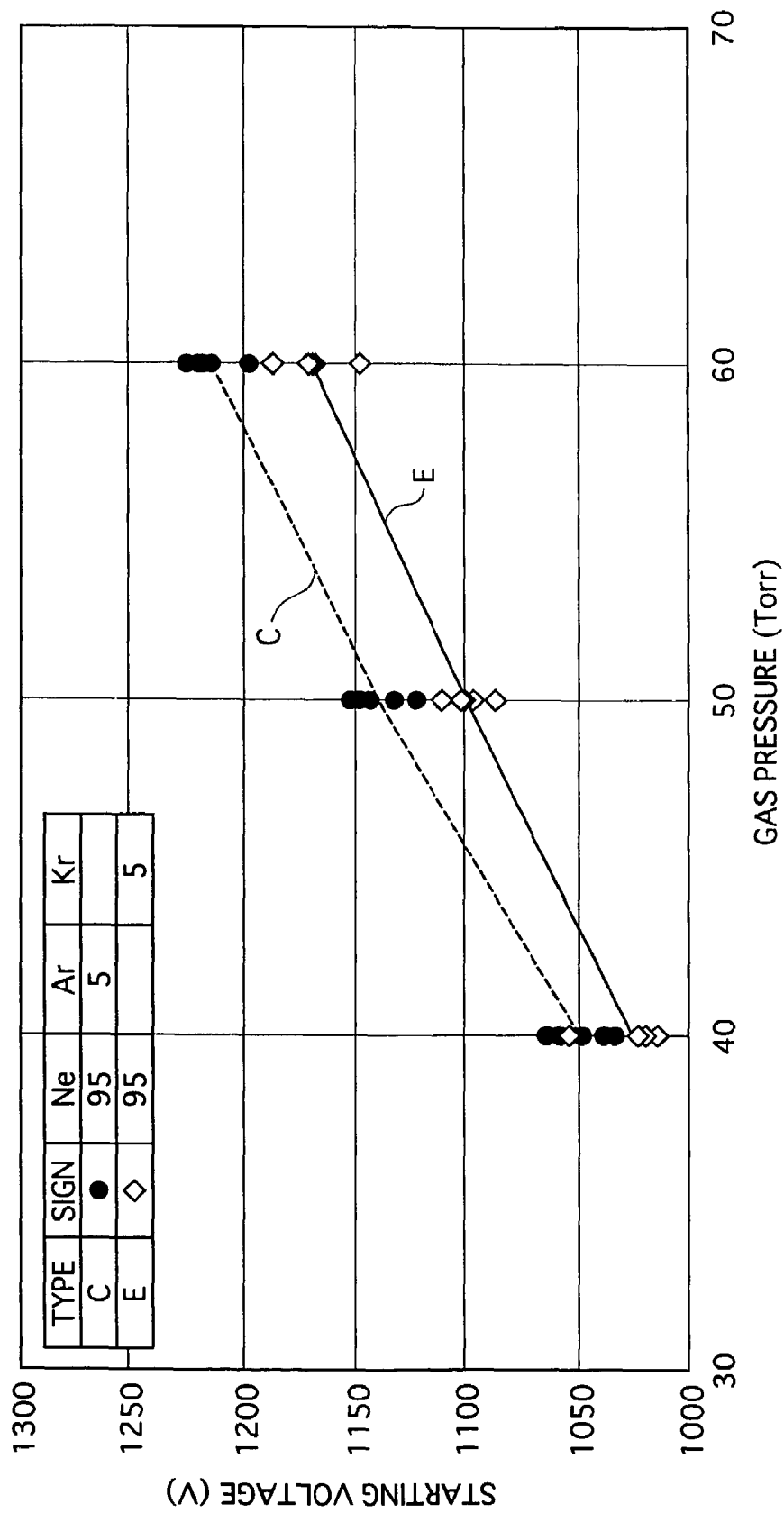
FIG. 20 is a plot of gas pressure versus starting voltage at ambient temperature 25° C. for various types of rare gases with various mix ratios.

FIG. 19 is a graph that was made based on the data of the starting voltage measurement results for the ambient temperature 0° C. shown in FIGS. 10 and 18. FIG. 20 is a graph that was made based on the data of the starting voltage measurement results for the ambient temperature 25° C. shown in FIGS. 10 and 18. It should be noted here that in FIGS. 19 and 20, all the five values of the measurement results (No. 1-5) are shown.

As shown in FIGS. 19 and 20, the starting voltage of the type-E lamp is lower than that of the conventional type-C lamp in any of the conditions (ambient temperatures, gas pressures). This indicates that the starting voltage is improved (lowered) by using the mix gas of neon and krypton instead of the mix gas of neon and argon.

[3] Lamp Efficiency

The inventors of the present invention also conducted an experiment for comparing, in terms of the lamp efficiency (lm/W), the conventional type-C lamp with type-D and type-E lamps at varying ambient temperatures (° C.). Detailed data of the ambient temperatures and the lamp efficiency is omitted here, but only the tendency of the relationship between the types is shown in FIG. 21.

Figure 21:
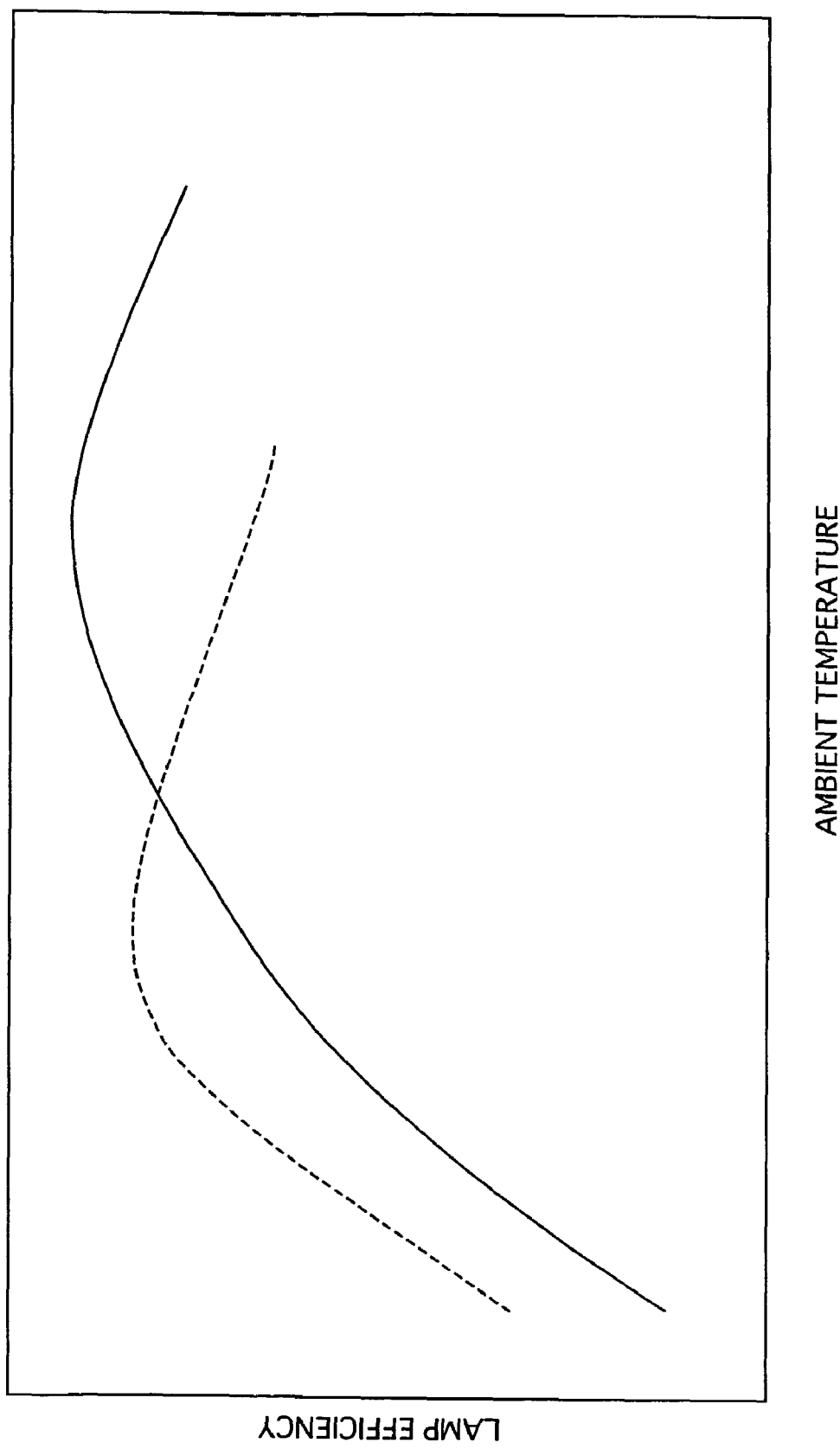
FIG. 21 is a plot of ambient temperature versus lamp efficiency.

FIG. 21 is a plot between the ambient temperature to the right and the lamp efficiency vertically. In FIG. 21, the dotted line indicates the type-C lamp and the solid line indicates the type-D and type-E lamps.

There is an optimum temperature for each of the type-C lamp and type-D, E lamp at which it takes the largest value of the lamp efficiency. The optimum temperature for the type C is approximately 60° C., and the optimum temperature for the type D, E is approximately 70° C. Also, as shown in FIG. 21, the largest value of the lamp efficiency of the type D, E is somewhat higher than that of the type C.

In the recent trend, the LCD apparatuses are becoming large, and the number of lights used in the backlight units of the direct-below type are also increasing. As a result, when a backlight unit is lighted, the temperature inside the backlight unit rises to approximately 70° C. This indicates that the conventional type-C lamp cannot take the largest value of the lamp efficiency during the lighting because it takes the largest value of the lamp efficiency at around 60° C., and that in contrast, the type-D, E lamp takes the largest value of the lamp efficiency when the backlight unit is lighted and has reached the highest temperature inside.

As described above, the cold-cathode fluorescent lamp of the present invention has a lower starting voltage at around 0° C. than conventional ones using the mix gas of mainly neon and argon. This contributes to the reduction in size of the power unit or the like. Furthermore, the highest lamp efficiency is obtained at the temperature inside the unit in which the cold-cathode fluorescent lamp of the present invention is disposed.

In the experiments described in the present embodiment, straight tube lamps are used. However, no matter what shape the glass bulb is in, the improvement in the lamp efficiency and the starting voltage is obtained by the unique composition of the mix gas enclosed in the glass bulb. The inventors of the present invention have confirmed these advantageous effects in the lamp 100 of Embodiment 1 using the light extraction portion 10d that is flat in the transverse cross section.

Up to now, the present embodiment has been explained. However, not limited to the present embodiment as it is, the present embodiment can be modified in various ways, for example, as follows.

1. In the present embodiment, the cold-cathode fluorescent lamp is used, as one example, as a light source for the backlight unit of the direct-below type. However, the cold-cathode fluorescent lamp of the present invention can also be used as a light source for the backlight unit of the edge-light type (also referred to as a side-light type or an optical waveguide type).

In the edge-light-type backlight units, an optical waveguide is placed at the back of the LCD panel, and fluorescent lamps are disposed in front of an end face of the optical waveguide. In a certain type of the edge-light-type backlight unit, two to four cold-cathode fluorescent lamps are arranged close to each other in front of an end face of the optical waveguide. In this type of the edge-light-type backlight unit, the ambient temperature of the cold-cathode fluorescent lamps rises to the same level as in the above-described direct-below-type backlight unit.

2. In the present embodiment, hollow-type electrodes in the shape of a cylinder with a bottom are used as the electrodes (cold cathode) of the cold-cathode fluorescent lamps. However, the shape of the electrodes is not limited to that of the hollow-type electrodes. For example, the electrodes may be shaped like a cylinder or a rectangular plate. Also, the electrodes may be made of nickel, molybdenum, or tantalum, other than niobium. Meanwhile, the regulations are restricting the amount of mercury for use due to concern about the environmental problems. When niobium, molybdenum, or tantalum is used as the material of the electrodes, the consumption of the electrodes is reduced, compared with the case where nickel is used as the material. It is therefore preferable to use such materials since it extends the lamp life with a small amount of mercury.

Embodiment 3

Now, prior to detailed description of Embodiment 3 of the present invention, the basic construction of the embodiment will be described.

Figure 22:
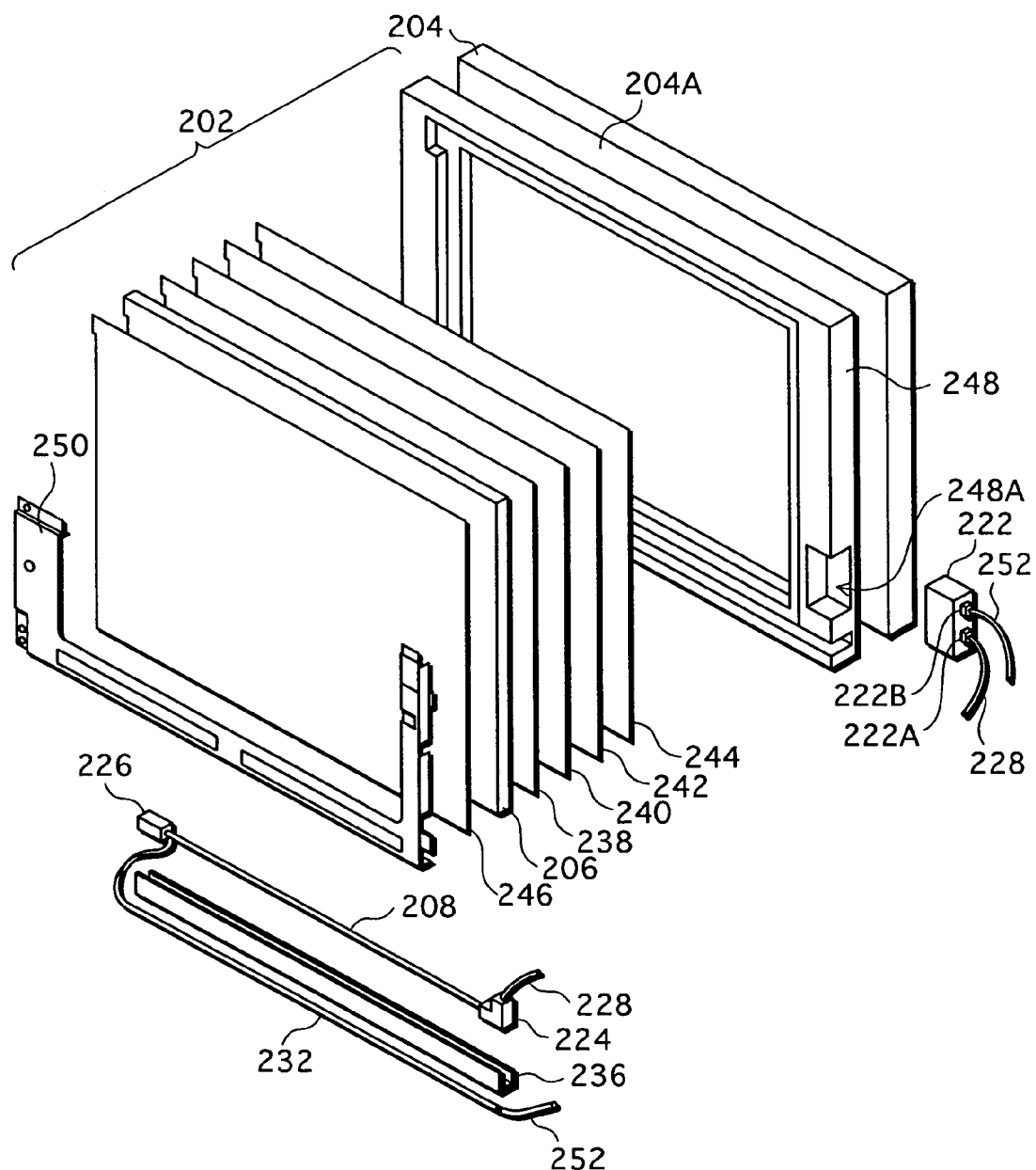
FIG. 22 is an exploded perspective view of an edge-light-type backlight unit in Embodiment 3.

FIG. 22 is an exploded perspective view of a backlight unit 202 and the like for a 15-inch LCD apparatus.

The backlight unit 202 is what is called edge-light type and is attached a back surface 204A of a LCD panel 204. The backlight unit 202 includes an optical waveguide 206 and a cold-cathode fluorescent lamp (hereinafter referred to merely as lamp) 208. The optical waveguide 206 is made of, for example, a transparent acrylic. The lamp 208 is, as a light source, attached to an edge (in the present embodiment, a lower end) of the optical waveguide 206.

Figures 23A, 23B:
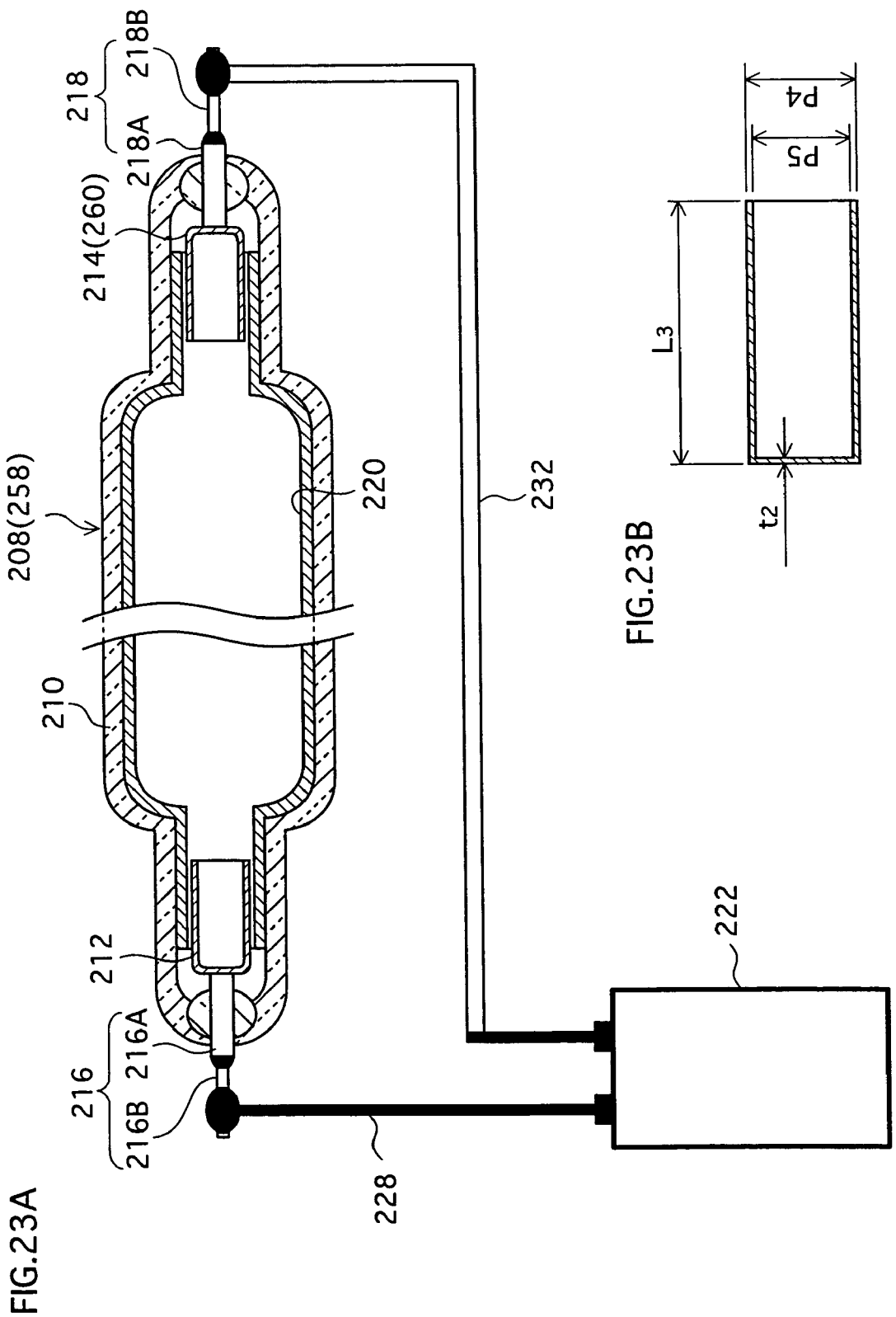
FIG. 23A is a cross-sectional view of a cold-cathode fluorescent lamp having the basic construction.
FIG. 23B shows the measurement of the hollow-type electrode constituting the cold-cathode fluorescent lamp.

FIG. 23A is a cross-sectional view of the lamp 208.

The lamp 208 includes a glass bulb 210 that is blocked at both ends. Electrodes 212 and 214 are disposed at the two ends of the glass bulb 210, respectively. As is the case with the glass bulb 10 in Embodiment 1, the glass bulb 210 is approximately circular in the transverse cross section at the portions between the two inner ends of the electrodes 212 and 214 and both ends of the glass bulb 210, and is approximately oval at the remaining middle portion. Each of the electrodes 212 and 214 is what is called hollow type and is in the shape of a cylinder with a bottom. Lead wires 216 and 218 are joined by, for example, laser welding, with the bottoms of the electrodes 212 and 214, respectively. The electrodes 212 and 214 are formed by processing nickel plates.

The lead wire 216 is formed by linking an inner lead wire 216A made of tungsten with an outer lead wire 216B made of nickel, and the lead wire 218 is formed by linking an inner lead wire 218A made of tungsten with an outer lead wire 218B made of nickel. The glass bulb is hermetically sealed by the inner lead wires 216A and 218A at both ends. The inner lead wires 216A and 218A and the outer lead wires 216B and 218B are circular in the transverse cross section, respectively. The inner lead wires 216A and 218A are 0.8 mm in the diameter, with their overall length being 3.0 mm, respectively. The outer lead wires 216B and 218B are 0.6 mm in the diameter, with their overall length being 1.5 mm, respectively.

The glass bulb 210 is made of hard borosilicate glass. The overall length of the glass bulb 210 is 298 mm, and the outer and inner diameters at both ends are 1.8 mm and 1.4 mm, respectively. The maximum outer diameter and minimum outer diameter of the portion that is approximately oval in the transverse cross section are approximately 2.1 mm and approximately 1.4 mm, respectively.

On the inner surface of the glass bulb 210, a fluorescent film 220 is formed, as shown in FIG. 23. The fluorescent film 220 includes three rare-earth fluorescent substances: red fluorescent substance ($Y_2O_3$: $Eu^{3+}$); green fluorescent substance ($LaPO_4$: $Ce^{3+}$, $Tb^{3+}$); and blue fluorescent substance ($BaMg_2Al_{16}O_{27}$: $Eu^{2+}$)

Also, the glass bulb 210 is filled with approximately 1200 μg of mercury (not illustrated) and a rare gas (not illustrated) that is a neon-argon mix gas (Ne 95%+Ar 5%) with the pressure of 10 kPa at 20° C.

Of the above-described components, the electrodes 212 and 214 will be described in more detail. As described above, the electrodes 212 and 214 are the hollow type. This is because the hollow-type electrodes are effective in restricting the sputtering that occurs at the electrodes by the discharge during the lamp lighting (for details, see, for example, Japanese Laid-Open Patent Application No. 2002-289138).

The electrodes 212 and 214 are in the same shape in the basic construction. The measurement shown in FIG. 23B is as follows: an electrode length L3=3.5 mm; an outer diameter p4=1.1 mm; and thickness t2=0.1 mm (inner diameter p5=0.9 mm). The electrodes 212 and 214 are disposed so that the center thereof is the tube axis of the glass bulb 210. It is understood from the above-described measurement that the distance between the outer surface of the electrodes 212 and 214 and the inner surface of the glass bulb 210 is approximately 0.15 mm. Such a small distance is set to prevent the lamp current from flowing into the space between the outer surface of the electrodes 212 and 214 and the inner surface of the glass bulb 210. In other words, with this arrangement, when the lamp is lighted, discharge occurs only inside the hollow electrodes 212 and 214 (occurs at the inner side and bottom surfaces of the cylinder-shaped electrodes). Here, in the electrodes, the surface that substantially contributes to the discharge is defined as "effective electrode surface", and the area of the effective electrode surface is defined as "effective electrode surface area". In the above-described hollow-type electrodes, the inner side surface and the inner bottom surface are the effective electrode surface. In terms of the electrode shown in FIG. 23B, the effective electrode surface area=$\{p5 \times \pi(L3-t2)+(p5/2)^2 \times \pi\}$. The effective electrode surface area of the electrodes 212 and 214 is approximately 10.2 $mm^2$.

The lead wires 216 and 218 of the lamp 208 are connected to wiring to receive supply of power from a power circuit unit 222 (FIG. 22) that includes an electronic ballast. The wiring will be described with reference to FIGS. 24A-24D.

Figure 24A:
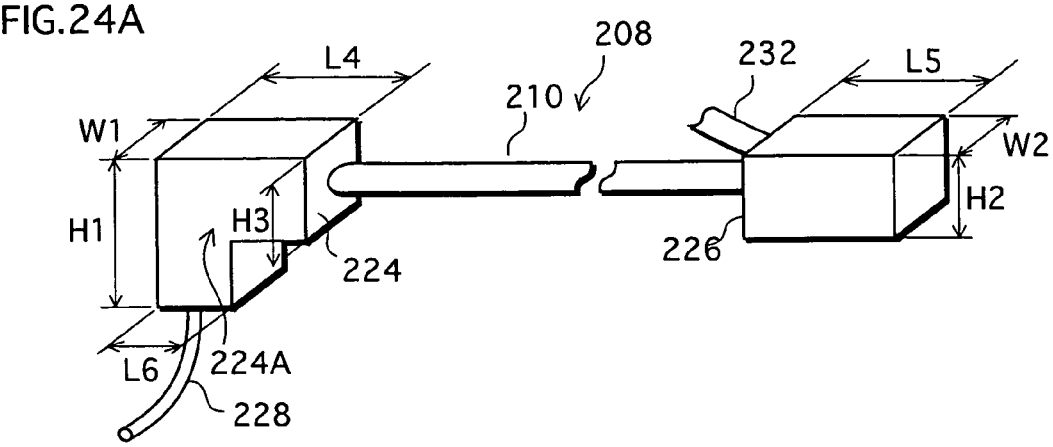
FIG. 24A is a perspective view showing the state in which bushes are respectively attached to two ends of the cold-cathode fluorescent lamp.

As shown in FIG. 24A, bushes 224 and 226 made of silicon rubber are fitted into both ends of the lamp 208, respectively. The bushes 224 and 226 will be described later. The wiring is connected within the bushes 224 and 226 to the lead wires 216 and 218, respectively.

Figures 24B, 24C:
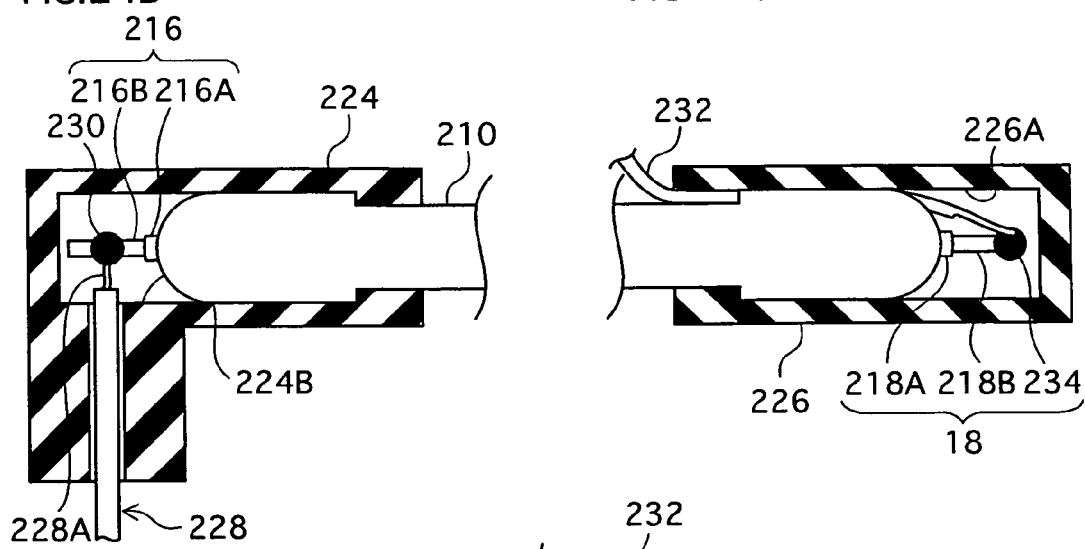
FIG. 24B is a cross-sectional view of a bush at the high-voltage-side end.
FIG. 24C is a cross-sectional view of a bush at the ground-side end.

FIG. 24B is a cross-sectional view of the bush 224. The leadwire 216 is connected to a high-voltage cable 228 (withstand pressure 3 kVrms) that is high-voltage-side wiring connecting to the power circuit unit 222. A conductive wire 228A of the high-voltage cable 228 is joined with the outer lead wire 216B by welding 230 while they are twisted with each other. The conductive wire 228A of the high-voltage cable 228 is made of tinned copper, and is 1.5 mm in diameter (1.77 $mm^2$ in cross section area). An overall length of the high-voltage cable 228 is 60 mm.

Figure 24D:
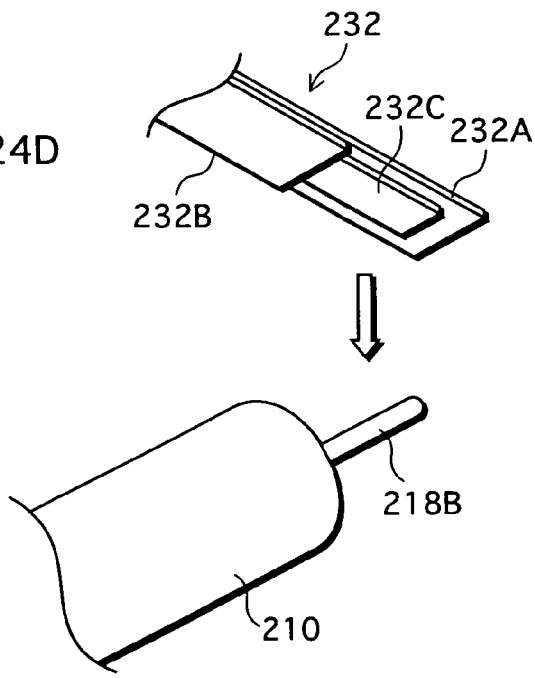
FIG. 24D shows the ground-side end of the cold-cathode fluorescent lamp and a flat cable to be connected to a lead wire at the ground-side end.

FIG. 24C is a cross-sectional view of the bush 226. The lead wire 218 is connected to a flat cable 232 that is in the shape of tape and is ground-side wiring connecting to the power circuit. As shown in FIG. 24D, the flat cable 232 is composed of: two insulating films 232A and 232B made of vinyl chloride; and a conductive foil 232C made of copper, the conductive foil 232C being sandwiched by the insulating films 232A and 232B. Part of the conductive foil 232C is exposed at both ends of the flat cable 232. One end of the flat cable 232 is joined with the outer lead wire 218B by welding 234 while the end is pressed on the outer lead wire 218B in the direction indicated by the arrow in FIG. 24D. The conductive foil 232C is 2.5 mm in width, and 0.2 mm in thickness (0.5 mm² in cross section area). An overall length of the flat cable 232 is 320 mm.

The measurement of the bush 224 shown in FIG. 24A covering an end of the lamp 208 on the side of the lead wire 216 is as follows: L4=6.0 mm; W1=2.8 mm; H1=7.5 mm; L6=2.0 mm, and H3=2.8 mm. The bush 224 has a housing hole 224B, which is circular in the transverse cross section, for housing an end of the lamp 208. The diameter of the housing hole 224B is set to be slightly smaller than the outer diameter of the glass bulb 210. The lamp 208 is pressed into the housing hole 224B. This enables the bush 224 to be attached firmly to the glass bulb 210.

The measurement of the bush 226 shown in FIG. 24A covering an end of the lamp 208 on the side of the lead wire 218 is as follows: L5=6.0 mm; W2=2.8 mm; and H2=2.8 mm. The bush 226 has a housing hole 226A, which is circular in the transverse cross section, for housing an end of the lamp 208. The diameter of the housing hole 226A is also set to be slightly smaller than the outer diameter of the glass bulb 210, and the lamp 208 is pressed into the housing hole 226A. This enables the bush 224 to be attached firmly to the glass bulb 210. When the lamp 208 is pressed into the housing hole 226A, the flat cable 232 is deformed along the outer circumference of the glass bulb 210 (bends).

The silicon rubber used in the bushes 224 and 226 is a synthetic resin known to have appropriate elasticity, to be superior in the electric withstand pressure characteristics and the heat resistance, and, in addition, to be relatively high in the heat conductivity.

Back to FIG. 22, the lamp 208 connected to the high-voltage cable 228 and the flat cable 232 and attached to the bushes 224 and 226 is placed at a lower end of the optical waveguide 206, as stated earlier. In this assembling, the bushes 224 and 226 are set in a reflector 236 that is in the shape of character U in the transverse cross section. The reflector 236 is formed by bending a long metal plate to be in the shape of character U in the transverse cross section. The inner faces (three faces surrounding three sides of the lamp 208) of the reflector 236 is coated with a reflecting film (not illustrated). The distance between the opposite two inner faces in the shape of character U is approximately 3.8 mm.

As shown in FIG. 22, two diffusion sheets 238 and 240 and two prism sheets 242 and 244 are disposed between the optical waveguide 206 and the LCD panel 204. A reflection sheet 246 is disposed on the other side of the optical waveguide 206 (see FIG. 22).

The diffusion sheets 238 and 240, the prism sheets 242 and 244, the reflection sheet 246 are put together with the optical waveguide 206, and then are set in a resin support frame 248 that is in the shape of a picture frame. The lamp 208 and the reflector 236 are also set in the resin support frame 248 together with the optical waveguide 206.

After the above-stated members are set in the resin support frame 248, a metal fixing plate 250 made of, for example, aluminum is fixed to the resin support frame 248 by, for example, screws.

Figure 25:
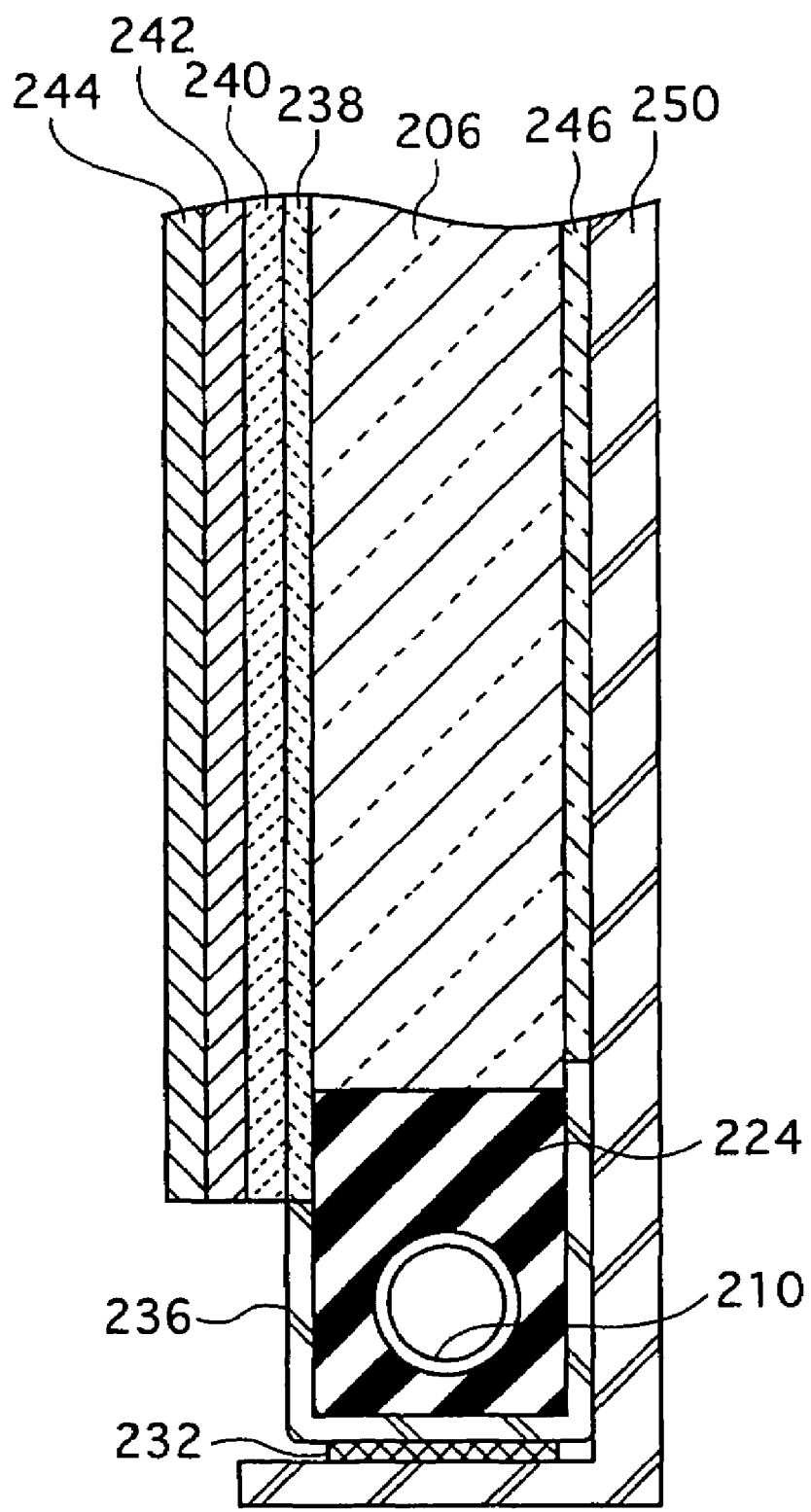
FIG. 25 is a cross section of a backlight unit, taken at a portion where a glass bulb is inserted in a high-voltage-side bush.

FIG. 25 is a cross section of the above-stated members and the metal fixing plate 250 having been fixed to the resin support frame 248. The cross section of FIG. 25 was taken at a portion where the glass bulb 210 is inserted in the bush 224. The resin support frame 248 is omitted in FIG. 25. As shown in FIG. 25, the reflector 236, sandwiching the bush 224 (226), also functions as a member to support the bush 224 (226).

Back to FIG. 22, the resin support frame 248 has a housing unit 248A for housing the power circuit unit 222, at the lower-right portion thereof (a portion close to an end of the lamp 208). The power circuit unit 222 is housed in the housing unit 248A. The high-voltage cable 228 is connected to a high-voltage-side output terminal 222A of the power circuit unit 222. The flat cable 232 is connected to a ground-side terminal 222B of the power circuit unit 222, via a linking wire 252. The linking wire 252 is a coated copper wire, the copper wire therein being 1.0 mm in diameter. The overall length of the linking wire 252 is 40 mm.

The lamp 208 constituting the backlight unit 202 having the above-described construction is lighted by the power circuit unit 222, with 7.0 mA of rated current and 58 kHz of lighting frequency. Also, the rated life of the lamp 208 is 10,000 hours.

Samples of the lamps 208 assembled with the LCD panel 204 as a LCD apparatus were lighted continuously. Some of them went off, for example, after 5,000 hours of lighting, before they reached the rated life.

The inventors of the present invention collected the short-life lamps 208 and investigated the cause of the short life.

By observing the collected lamps 208, it was found that there is a difference in the blackening between two ends of the inner wall of the glass bulb 210 (hereinafter, this phenomenon is referred to as blackening deviation). It was also found that in the lamps having the blackening deviation, an end on the side of the lead wire 218 connecting to the flat cable 232 (hereinafter referred to as a ground-side end) has a larger amount of blackening than an end on the side of the lead wire 216 connecting to the high-voltage cable 228 (hereinafter referred to as a high-voltage-side end).

The inventors of the present invention guessed that the blackening deviation might be some cause of the short-life of the lamp, and further guessed that the blackening deviation occurs because the lead wires 216 and 218 are connected to different cables.

Based on the above assumption, the inventors conducted a continuous lighting experiment (comparative experiment 1) in which a lamp was continuously lighted under conditions that the lead wires 216 and 218 were respectively connected to cables of the same length and type (general-purpose coated copper strand wire), and power was supplied from the power circuit unit 222 via the cables. According to the results of the comparative experiment 1, the rated life was achieved and the blackening deviation was not observed.

The inventors of the present invention also conducted an experiment in which samples of short-life lamps 208 were continuously lighted, and then the temperature of the surface was measured at the two tube ends (corresponding to electrodes arranged at the circumference of the glass bulb 210). It was found from the results that at a point in time immediately before the lamps went off (life terminal stage), the surface temperature at the end on the side of high voltage (hereinafter referred to as high-voltage-side end surface temperature) was greatly different from the surface temperature at the end on the side of the ground (hereinafter referred to as ground-side end surface temperature) (hereinafter, this phenomenon is referred to as "temperature disequilibrium").

More specifically, when a lamp having the same construction as the lamp 208 except that the glass bulb 210 is in the shape of a straight tube was used in the experiment, the temperature measurement results showed that the high-voltage-side end surface temperature was approximately 103° C. and the ground-side end surface temperature was approximately 118° C. The inventors presumed that this was resulted from a difference in the heat conductivity between the cables connected to the lead wires 216 and 218. Based on this presumption, the inventors conducted an experiment (comparative experiment 2) in which although it was not practical, power was supplied using the flat cable 232 from the power circuit unit 222 to both the lead wires 216 and 218, and the lamp 208 was continuously lighted. According to the results of the comparative experiment 2, the temperature disequilibrium did not occur, with the ground-side end surface temperature being approximately 118° C. and the high-voltage-side end surface temperature rising to approximately 117° C. The blackening deviation was not observed in the lamp that had been subjected to the comparative experiment 2.

The inventors of the present invention also conducted an experiment (comparative experiment 3) in which a lamp was continuously lighted under conditions that the lead wires 216 and 218 were respectively connected to cables of the same length and type (general-purpose coated copper strand wire), and power was supplied from the power circuit unit 222 via the cables, while a forced air cooling was performed on only one end of the glass bulb 210. According to the results of the comparative experiment 3, the lamp 208 went off before it reached the rated life. Also, it was found by observing the short-life lamp 208 that a larger amount of blackening occurred at the end on which the forced air cooling was performed than at the end without the forced air cooling, whether the end was on the side of the high voltage or the ground.

Based on the above-described results of the comparative experiments 1 to 3, the inventors of the present invention analyzed the cause of the short life of the lamp 208 having the basic construction in the continuous lighting, as follows. The analysis results will be explained with reference to FIG. 23. It should be noted here that in FIG. 23, the high-voltage cable 228, the flat cable 232, and the power circuit unit 222 are shown in a simplified manner.

(A) In the normal lighting, electrons are released when mercury ions beat the effective surfaces of the electrodes 212 and 214, maintaining the discharge. In this process, heat is generated by the electrodes 212 and 214, and the generated heat mainly transfers to outside the glass bulb 210 via the lead wires 216 and 218, respectively. The heat having transferred to the lead wires 216 and 218 passes through the high-voltage cable 228 and the flat cable 232, respectively. Here, the high-voltage cable 228 and the flat cable 232 have different heat conductivity due to the difference in the cross section area of the conductor. That is to say, the flat cable 232, which has 0.5 mm$^2$ of the conductor cross section area, is lower than the high-voltage cable 228 which has 1.78 mm$^2$ of the conductor cross section area, in the heat conductivity. Accordingly, if the electrodes 212 and 214 generate the same amount of heat, a smaller amount of heat is transferred from the electrode 214 than from the electrode 212, and the electrode 214 rises to a higher temperature than the electrode 212. As a result, in the glass bulb 210, the ambient temperature of the electrode 214 (hereinafter referred to as ground-side end temperature) is higher than that of the electrode 212 (hereinafter referred to as high-voltage-side end temperature). The difference between the high-voltage-side end temperature and the ground-side end temperature leads to the difference between the high-voltage-side end surface temperature and the ground-side end surface temperature.

(B) As a difference in the temperature develops between the two ends of the glass bulb 210, the mercury in the glass bulb 210 as a whole gradually moves to (gathers at) an end (high-voltage-side end) that is lower in the temperature than the other end. An end (ground-side end) that is higher in the temperature than the other end falls into a kind of mercury deficiency state in which mercury is thin (hereinafter, this phenomenon is referred to as "mercury distribution deviation").

(C) At the ground-side end where mercury is thin, the cathode drop voltage increases.

(D) When this happens, the amount of the material of the electrode scattered by sputtering increases at the ground-side end. This leads to the increase of the blackening of the inner wall of the glass bulb 210. This phenomenon is the blackening deviation described earlier. The material scattered by the electrode scattering traps the rare gas as it travels inside the glass bulb 210 and then adheres to the inner wall. This indicates that the rare gas is consumed as much. Also, due to the increase in the cathode drop voltage, the amount of heat generated at the ground-side electrode 214 increases (electrode temperature increases).

(E) The above process is followed by the acceleration of mercury distribution deviation->the increase of the cathode drop voltage->the increase of consumption of the rare gas due to the material scattered by the electrode scattering and the increase of the amount of heat generated at the ground-side electrode (increase of electrode temperature), and these processes are repeated as a cycle to promote the consumption of the rare gas. As a result of this, the lamp impedance gradually decreases, and at some point in time, an excess current flows, a fuse in the power circuit unit 222 blows out, and the lamp 208 goes off.

As apparent from the above analysis, the underlying cause of the acceleration of the consumption of the rare gas which causes the lamp extinction lies in the mercury distribution deviation, which is caused by the disequilibrium in the temperature between the two ends of the glass bulb.

The inventors of the present invention therefore determined to solve the above-described problem by eliminating the disequilibrium in the temperature between the two ends of the glass bulb. The inventors of the present invention studied the means to solve the problem from the aspects of: (1) improving the lamp itself; and (2) improving the whole backlight unit. In doing this, the inventors of the present invention presupposed that the basic construction, in which the two cables (that is, the high-voltage cable and the flat cable) being different in the heat conductivity are used to supply power to the two lead wires, is held. This is because the backlight unit is used for a LCD apparatus that is expected to be thin and compact.

The following describes specific forms of the means to solve the problem.

The mercury distribution deviation is recognized as the blackening deviation. Accordingly, in the following examples, a judgment on whether a mercury distribution deviation has occurred is made by judging whether the blackening deviation has occurred.

1. Improving Lamp

EXAMPLE 1

Figure 26:
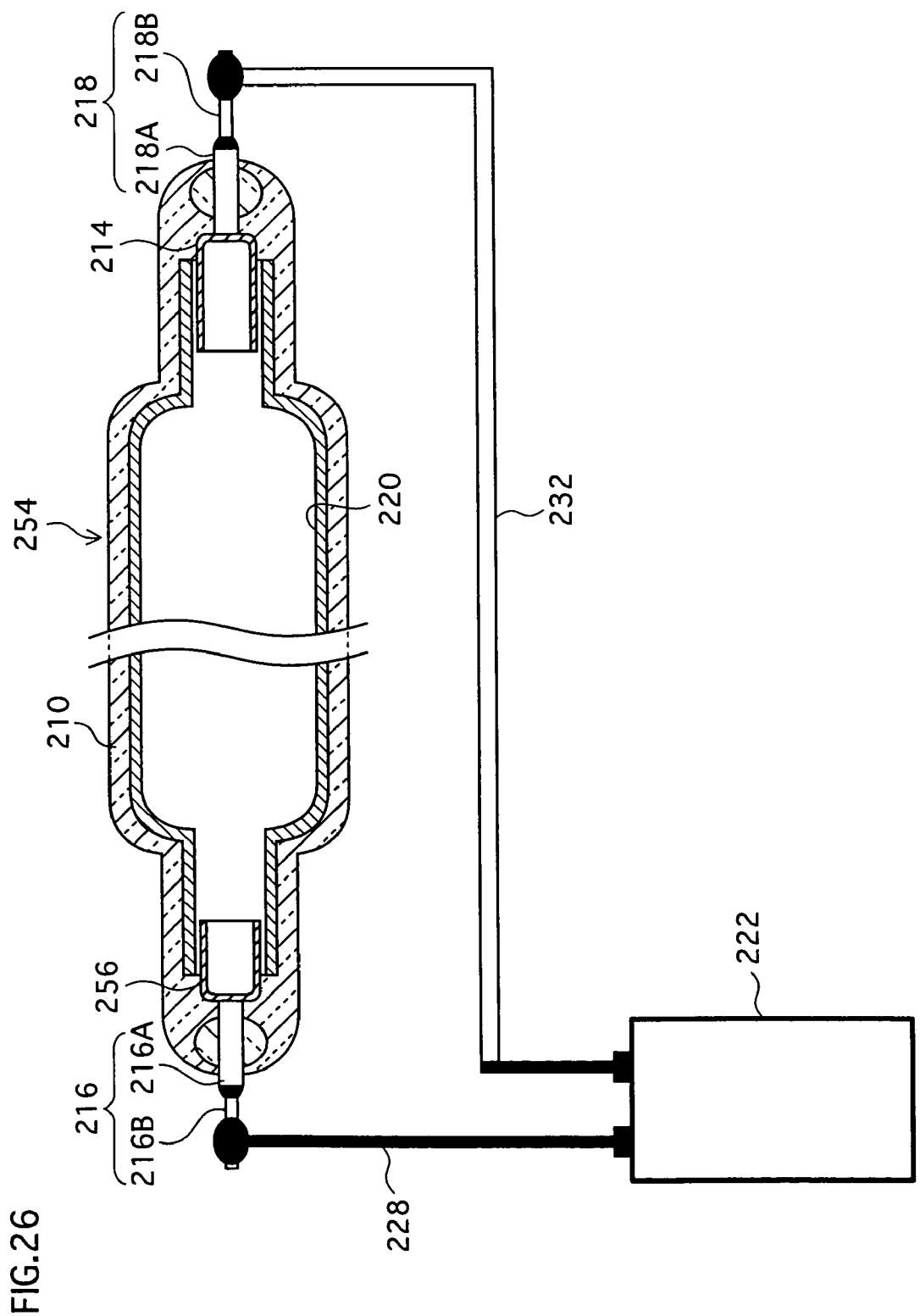
FIG. 26 is a cross section showing the construction of the cold-cathode fluorescent lamp in Example 1.

FIG. 26 is a cross section showing the construction of a lamp 254 in Example 1.

The lamp 254 in Example 1 has basically the same construction as the lamp 208 except that they differ from each other in the shape (size) of the hollow-type electrode disposed at the high-voltage side end. Accordingly, only the difference will be explained in the following description and the same components in the lamp 208 and the lamp 254, to which common reference numbers are assigned, will be omitted or explained in a simplified manner.

In the lamp 208 with the basic construction, the ground-side electrode 214 and the high-voltage-side electrode 212 are made of the same material in the same shape (see FIG. 23). In the lamp 254 in Example 1, the ground-side electrode has the basic construction, but the high-voltage-side electrode is shorter than the high-voltage-side electrode 212 (along the tube axis). That is to say, to eliminate the disequilibrium in the temperature between the two ends of the glass bulb 210, the overall length of a high-voltage-side electrode 256 was reduced so that the effective electrode surface area thereof is reduced and the amount of heat generated by the electrode 256 is increased. Also, the electrode 256 is smaller than the electrode 212 (electrode 214) in the heat capacity. Due to the synergistic effects with this, the temperature in the electrode 256 for generating heat is increased.

More specifically, in the high-voltage-side electrode 256 of the lamp 254 in correspondence with the measurement shown in FIG. 23B, the overall length has been reduced from 3.5 mm to 2.5 mm. The other values of the measurement are the same as those of the electrode 212 (electrode 214). In this case, the effective electrode surface area Sh of the high-voltage-side electrode 256 is 7.4 mm$^2$, and the area ratio Re, which is obtained by dividing the value of "Sh" by the effective electrode surface area Se (=10.2 mm$^2$) of the ground-side electrode 214, is 0.73.

A continuous lighting experiment was conducted on a backlight unit in which the lamp 254 was loaded, under the same conditions as the experiment for the lamp 254 with the basic construction (58 kHz of lighting frequency, 7.0 mA of lamp current). According to the results of the experiment, it was found that the temperature disequilibrium had almost been eliminated, that the blackening deviation was not observed, and that the rated life was achieved.

Also, the continuous lighting experiment was conducted with a lamp that has the same construction as the lamp 254 except that the glass bulb 210 of the lamp is a straight tube. According to the results of the experiment, it was found that the temperature disequilibrium had almost been eliminated, with the high-voltage-side end surface temperature being approximately 116° C., and the ground-side end surface temperature being approximately 118° C.

It should be noted here that the area ratio Re is not limited to 0.73. More specifically, the inventors of the present invention found that the lamp short life can be prevented by setting the area ratio Re to be in a range from 0.50 to 0.90. It was confirmed that when the area ratio Re is set to be in this range, the difference between the ground-side end surface temperature and the high-voltage-side end surface temperature is in a range approximately from +5° C. to −5° C., and the blackening deviation is prevented. It was also confirmed that when the area ratio Re is lower than 0.5, the blackening deviation occurs as the blackening develops at the high-voltage-side end.

In the above-described example, the high-voltage-side electrode in the lamp 208 with the basic construction was decreased in length to solve the problem. However, conversely, the ground-side electrode may be increased in length, or the high-voltage-side electrode may be decreased and at the same time, the ground-side electrode may be increased in length. The point is that it is possible to extend the length of the lamp life by making the effective electrode surface area of the high-voltage-side electrode relatively larger than that of the ground-side electrode. The optimum range for achieving the purpose is as shown above.

EXAMPLE 2

Example 1 is constructed to solve the problem by changing the shape of the electrodes. In contrast, Example 2 is constructed to solve the problem by changing the material of the electrodes, without changing the shape.

The construction of a lamp 258 in Example 2 is similar to the basic construction. The construction will therefore be described with reference to FIG. 23.

In the lamp 208 with the basic construction, the ground-side electrode 214 and the high-voltage-side electrode 212 are made of the same material. However, in the lamp 258 in Example 2, the high-voltage-side electrode is the same as the basic construction, but the ground-side electrode is made of a material that is lower than the material of the high-voltage-side electrode 212 in the work function. When an electrode is made of a material with a lower work function, the cathode drop voltage at the electrode, namely, the electrode loss becomes smaller, and the amount of heat generated by the electrode becomes smaller. That is to say, if the ground-side electrode is made of a material that is lower than the material of the high-voltage-side electrode 212 in the work function, the amount of heat generated by the electrode is reduced. This eliminates the disequilibrium in the temperature between the two ends of the glass bulb.

More specifically, the high-voltage-side electrode 212 of the lamp 258 is made of nickel (Ni) (work function: 4.50 eV), and the ground-side electrode 60 is made of niobium (Nb) (work function: 4.01 eV).

A continuous lighting experiment was conducted on a backlight unit in which the lamp 258 was loaded, under the same conditions as the experiment for the lamp with the basic construction. According to the results of the experiment, it was found that the temperature disequilibrium had almost been eliminated, that the blackening deviation was not observed, and that the rated life was achieved.

Also, the above-described continuous lighting experiment was conducted with a lamp that has the same construction as the lamp 258 except that the glass bulb 210 of the lamp is a straight tube. According to the results of the experiment, it was found that the temperature disequilibrium had almost been eliminated, with the high-voltage-side end surface temperature being approximately 103° C., and the ground-side end surface temperature being approximately 101° C.

It should be noted here that the material of the electrode 60 on the ground side is not limited to niobium, but maybe tantalum (Ta) (work function: 4.30 eV) or molybdenum (Mo) (work function: 4.23 eV). The inventors of the present invention found that the problem of short lamp life is prevented and the rated life is satisfied if the difference in the work function between the materials of the high-voltage-side electrode and the ground-side electrode is not lower than 0.20 eV. Accordingly, in so far as the difference in the work function between the two materials is not lower than 0.20 eV, any materials, not limited to the above mentioned ones, may be selected. This also applies to the combination of the materials. For example, tantalum (Ta) or molybdenum (Mo) may be selected as a material of the high-voltage-side electrode, and at the same time niobium (Nb) may be selected as a material of the ground-side electrode.

It should be noted here that the above-mentioned work function refers to a value measured by a thermal method.

EXAMPLE 3

Examples 1 and 2 are constructed to solve the problem by changing the shape and material of the electrodes, respectively. In contrast, Example 3 is constructed to solve the problem by changing the lead wires, without changing the shape and material of the electrodes.

Figure 27:
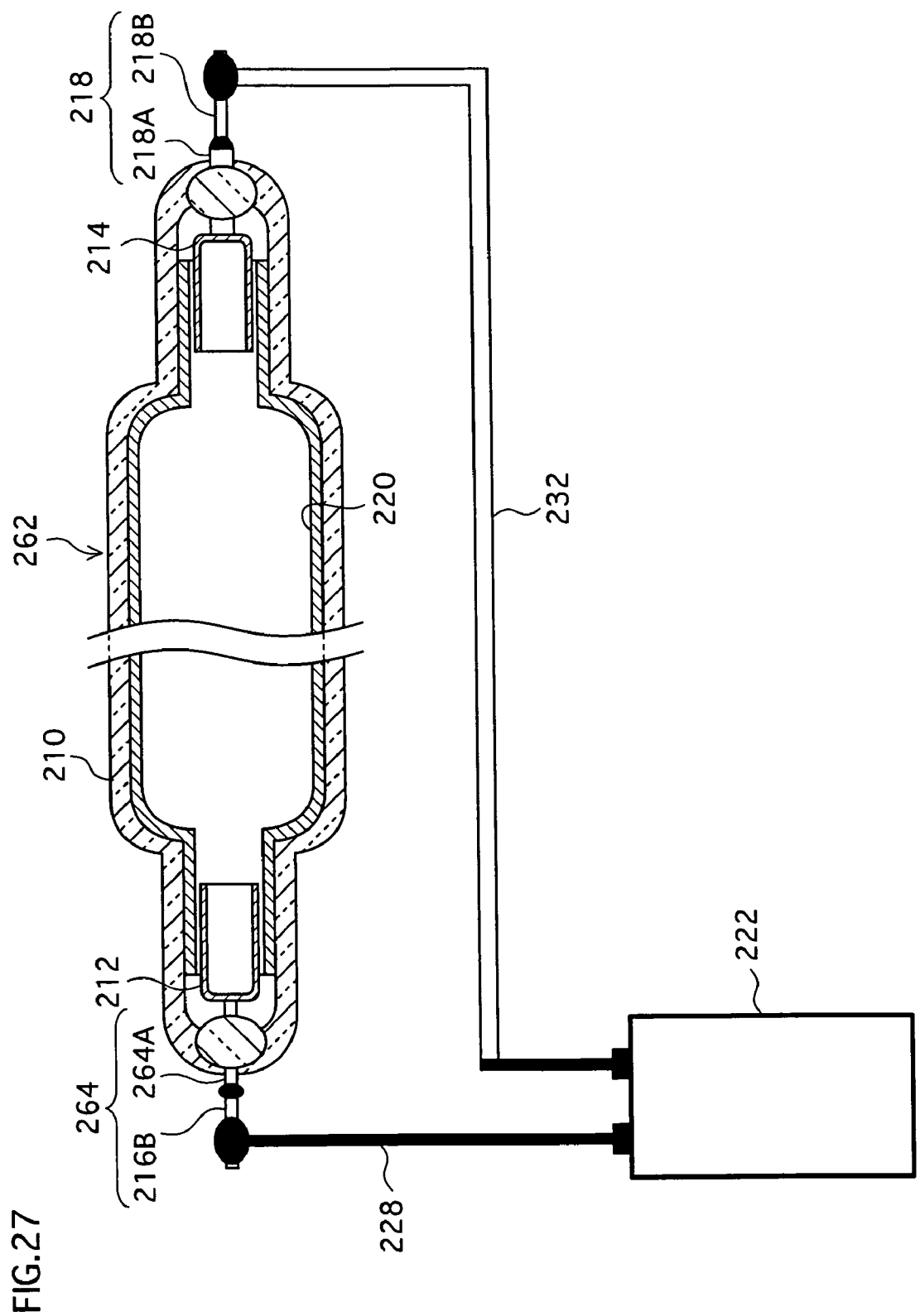
FIG. 27 is a cross section showing the construction of the cold-cathode fluorescent lamp in Example 3.

FIG. 27 is a cross section showing the construction of a lamp 262 in Example 3.

The lamp 262 in Example 3 has basically the same construction as the lamp 208 except that they differ from each other in the shape (diameter) of the inner lead wire connected to the high-voltage-side electrode. Accordingly, only the difference will be explained in the following description and the same components in the lamp 208 and the lamp 262, to which common reference numbers are assigned, will be omitted or explained in a simplified manner.

In the lamp 208 with the basic construction, the inner lead wire connected to the ground-side electrode 214 (hereinafter referred to as "ground-side inner lead wire") and the inner lead wire connected to the high-voltage-side electrode 212 (hereinafter referred to as "high-voltage-side inner lead wire") are made of the same material in the same shape (see FIG. 23). In the lamp 262 in Example 3, the ground-side inner lead wire has the basic construction, but the high-voltage-side inner lead wire is smaller than the inner lead wire 216A (FIG. 23) in the transverse cross section area. This arrangement is made to eliminate the disequilibrium in the temperature between the two ends of the glass bulb 210, which is fulfilled as follows. The high-voltage-side inner lead wire is decreased in the heat conductivity by reducing the transverse cross section area thereof. This decreases the transference of the heat generated by the high-voltage-side electrode 212 to the high-voltage cable 228, which leads to the increase in the temperature of the high-voltage-side electrode 212, and this achieves the elimination of the disequilibrium in the temperature between the two ends of the glass bulb 210.

More specifically, the diameter of the high-voltage-side inner lead wire of the lamp 262 is set to 0.6 mm, which is smaller than the diameter of the basic construction. In this case, a wire diameter ratio Rw, which is obtained by dividing a diameter Wh (=0.6 mm) of a high-voltage-side inner lead wire by a diameter We (=0.8 mm) of a ground-side inner lead wire, is 0.75.

A continuous lighting experiment was conducted on a backlight unit in which the lamp 262 was loaded, under the same conditions as the experiment for the lamp with the basic construction. According to the results of the experiment, it was found that the temperature disequilibrium had almost been eliminated, that the blackening deviation was not observed, and that the rated life was achieved.

Also, the above-described continuous lighting experiment was conducted with a lamp that has the same construction as the lamp 262 except that the glass bulb 210 of the lamp is a straight tube. According to the results of the experiment, it was found that the temperature disequilibrium had almost been eliminated, with the high-voltage-side end surface temperature being approximately 103° C., and the ground-side end surface temperature being approximately 105° C.

It should be noted here that the value of the wire diameter ratio Rw is not limited to 0.75. The inventors of the present invention found that the problem of short lamp life is prevented if the wire diameter ratio Rw is set to be in a range from 0.65 to 0.85. It was confirmed that when the wire diameter ratio Rw is set to be in this range, the difference between the ground-side end surface temperature and the high-voltage-side end surface temperature is in a range approximately from +5° C. to −5° C., and the blackening deviation is prevented. It was also confirmed that when the wire diameter ratio Rw is lower than 0.65, the blackening deviation occurs as the blackening develops at the high-voltage-side end.

In the above-described example, the transverse cross section area of the high-voltage-side inner lead wire, in the lamp 208 with the basic construction, is reduced to solve the problem. However, conversely, the transverse cross section area of the ground-side inner lead wire may be increased, or the high-voltage-side inner lead wire may be decreased and at the same time, the ground-side inner lead wire may be increased in the transverse cross section area. The point is that it is possible to extend the length of the lamp life by making the transverse cross section area of the high-voltage-side inner lead wire relatively smaller than that of the ground-side inner lead wire. The optimum range for achieving the purpose is as shown above.

2. Improving Whole Backlight Unit

The above-described Examples 1-3 are constructed to solve the problem by modifying the lamp itself. In contrast, the following examples are constructed to solve the problem by modifying the backlight unit. More specifically, in the following examples, the transference of the heat from the bushes attached to the ends of the lamp to the reflector (supporting member) 236 and the metal fixing plate 250 (FIGS. 22 and 25) is adjusted to solve the problem.

EXAMPLE 4

Figure 28:
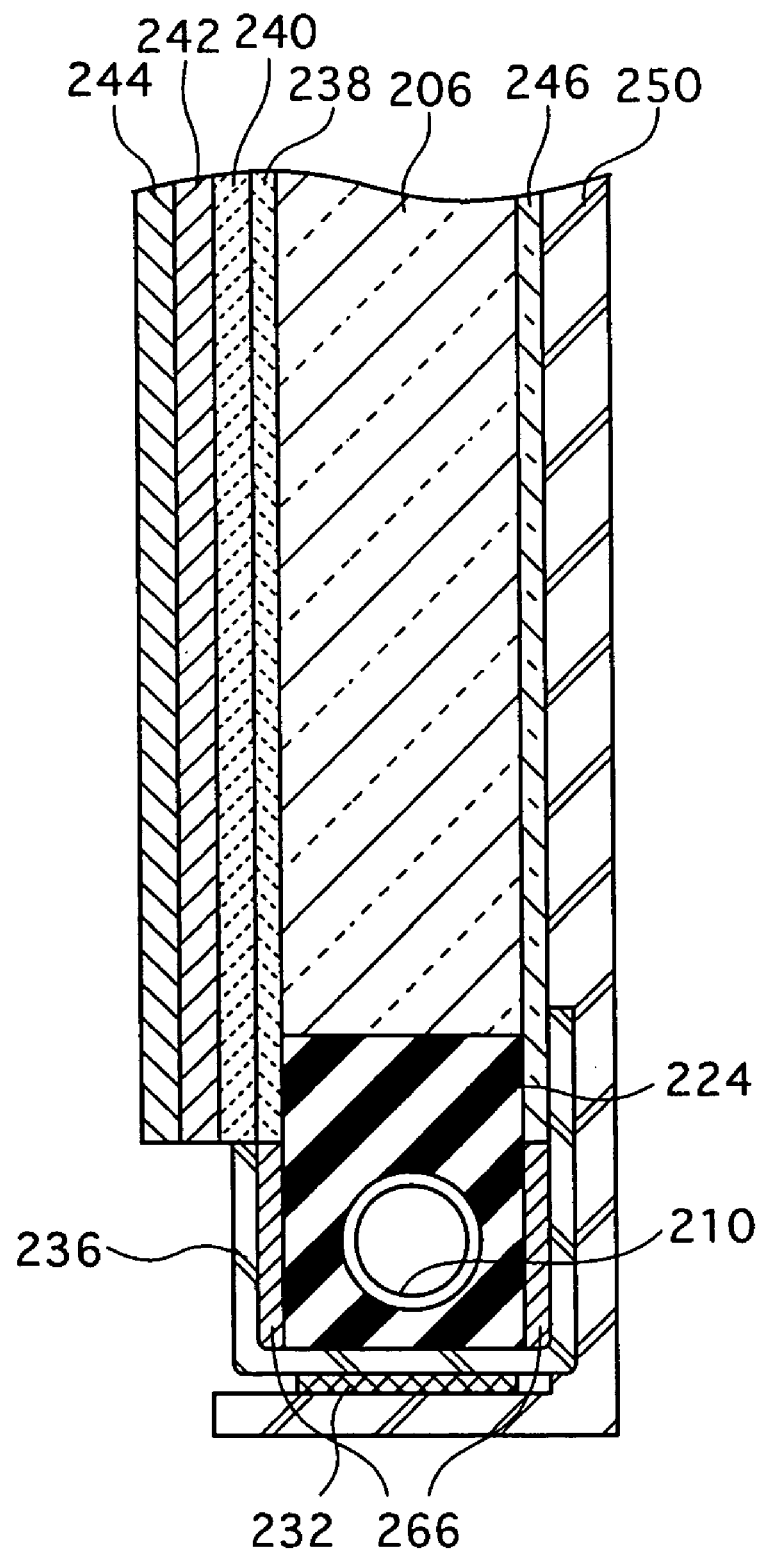
FIG. 28 is a cross section showing the construction of the backlight unit in Example 4.

In Example 4, a heat insulating medium is disposed between the bush 224 and the reflector 236 (FIGS. 22 and 25) at the high-voltage-side end. With this arrangement, the transference of the heat from the surface of the high-voltage-side end to the bush 224, to the reflector 236 and to the metal fixing plate 250 is interrupted by the heat insulating medium. This allows the temperature at the high-voltage-side end to increase, leading to the elimination of the disequilibrium in the temperature between the two ends of the glass bulb 210. FIG. 28 is a cross section of the backlight unit of Example 4, taken at a portion where the glass bulb 210 is inserted in the bush 224. FIG. 28 corresponds to FIG. 25. The backlight unit of Example 4 basically has the same construction as the backlight unit 202 having the basic construction, except that it additional has the heat insulating medium. Accordingly, only the difference will be explained in the following description and the same components in the backlight unit of Example 4 and the backlight unit 202, to which common reference numbers are assigned, will be omitted or explained in a simplified manner.

In the present example, two sheets of resin film tape 266 were used as the heat insulating medium.

More specifically, a polyethylene terephthalate film that is 350 μm in thickness, 6 mm in length, and 3 mm in width was, as the resin film tape 266, adhered to an end face 224A (see FIG. 24A), which faces the reflector 236, and to an end face opposite to the end face 224A. As a result of this, as shown in FIG. 28, the resin film tape 266 was inserted between the bush 224 and the reflector 236.

A continuous lighting experiment was conducted on the lamp 208 loaded in the backlight unit with the above-described construction, under the same conditions as the experiment for the lamp with the basic construction. According to the results of the experiment, it was found that the temperature disequilibrium had almost been eliminated, that the blackening deviation was not observed, and that the rated life was achieved.

Also, the above-described continuous lighting experiment was conducted with a lamp that has the same construction as the lamp 208 except that the glass bulb 210 of the lamp is a straight tube. According to the results of the experiment, it was found that the temperature disequilibrium had almost been eliminated, with the high-voltage-side end surface temperature being approximately 116° C., and the ground-side end surface temperature being approximately 118° C.

It should be noted here that the heat insulating medium is not limited to the polyethylene terephthalate film, but may be any material that is lower than the bush 224 and the reflector 236 in the heat conductivity. For this reason, it should be noted here that the term "heat insulation" used in the present example means a reduction of the heat transference in a heat path, not in the sense of a complete interruption of the heat transference.

EXAMPLE 5

Figure 29:
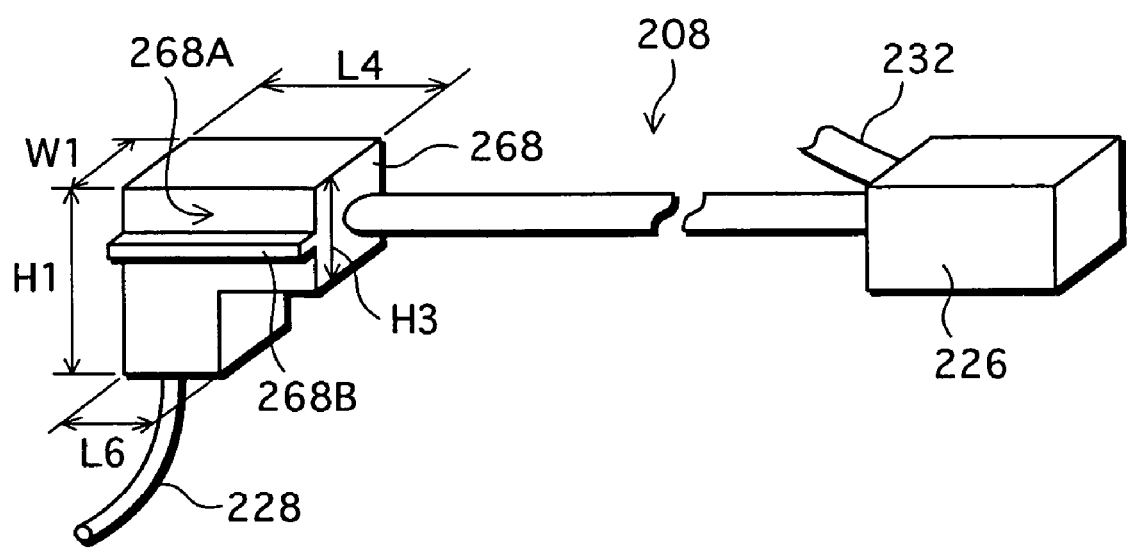
FIG. 29 is a perspective view showing the state in which bushes are respectively attached to two ends of the cold-cathode fluorescent lamp of the backlight unit in Example 5.

In Example 5, the area with which the bush 224 and the reflector 236 (FIGS. 22 and 25) are in contact with each other at the high-voltage-side end has been reduced. With this arrangement, the transference of the heat from the surface of the high-voltage-side end of the glass bulb 210 to the bush 224, to the reflector 236 and to the metal fixing plate 250 is reduced. This allows the temperature at the high-voltage-side end to increase, leading to the elimination of the disequilibrium in the temperature between the two ends of the glass bulb 210. FIG. 29 shows the lamp 208 loaded in the backlight unit of Example 5. As shown in FIG. 29, bushes 268 and 226 are attached to the two ends of the lamp 208. FIG. 29 corresponds to FIG. 24A. The backlight unit of Example 5 basically has the same construction as the backlight unit 202 having the basic construction, except that the bushes attached to the two ends are different from the bushes of the basic construction in the shape. Accordingly, only the difference will be explained in the following description and the same components in the backlight unit of Example 4 and the backlight unit 202, to which common reference numbers are assigned, will be omitted or explained in a simplified manner.

In Example 5, in the bush 268 attached to the high-voltage-side end, a projection 268B, which is 1.0 mm in width, 6.0 mm in length, and 0.6 mm in height from an end face 268A, was formed on the end face 268A that is one of the two end faces facing respectively surfaces of the reflector 236 (see FIGS. 22 and 25). With this arrangement, on the side of the end face 268A out of the two end faces, only the top face of the projection 268B is in contact with the reflector 236 (see FIGS. 22 and 25). As a result of this, the contact area is reduced, compared with the case where the projection 268B is not formed, and substantially the whole surface of the end face 224A (see FIG. 24A) of the bush 224 is in contact with the reflector 236. It should be noted here that the measurement for each sign in FIG. 29 is the same as that of the basic construction in FIG. 24A.

A continuous lighting experiment was conducted on the lamp 208 loaded in the backlight unit with the above-described construction, under the same conditions as the experiment for the lamp with the basic construction. According to the results of the experiment, it was found that the temperature disequilibrium had almost been eliminated, that the blackening deviation was not observed, and that the rated life was achieved.

Also, the above-described continuous lighting experiment was conducted with a lamp that has the same construction as the lamp 208 except that the glass bulb 210 of the lamp is a straight tube. According to the results of the experiment, it was found that the temperature disequilibrium had almost been eliminated, with the high-voltage-side end surface temperature being approximately 116° C., and the ground-side end surface temperature being approximately 118° C.

EXAMPLE 6

In Example 6, the contact pressure with which the bush 224 and the reflector 236 (FIGS. 22 and 25) are in contact with each other at the high-voltage-side end has been made smaller than the contact pressure with which they are in contact with each other at the ground-side end. With this arrangement, the transference of the heat from the bush 224 to the reflector 236 is reduced. This allows the temperature at the high-voltage-side end to increase, leading to the elimination of the disequilibrium in the temperature between the two ends of the glass bulb 210.

More specifically, in the basic construction shown in FIG. 24A, W1 is decreased from 3.8 mm to 3.4 mm for the bush 224 at the high-voltage-side end, and W2 is increased from 3.8 mm to 4.2 mm for the bush 226 at the ground-side end. The other measurement is the same as that of the basic construction.

As described earlier, the distance between the opposite two inner faces of the reflector 236 in the shape of character U is approximately 3.8 mm. The bushes 224 and 226 are respectively sandwiched by the inner faces of the reflectors 236, which are in the shape of letter U, with the pressure being applied to the bushes in the direction of the width (W1, W2). With the above-described change in the width of the bushes, the ground-side bush 226 is elastically deformed by the difference in width (0.4 mm), which increases the contact pressure. On the other hand, a space is generated between the high-voltage-side bush 224 and the reflector 236 by the difference in width (0.4 mm). As a result of this, the high-voltage-side bush 224 becomes in contact with the bottom and one of the two side faces of the reflector 236 in the shape of character U, and the contact pressure of the high-voltage-side bush 224 becomes lower than the contact pressure of the ground-side bush 226, which has been increased due to the elastic deform of the silicon rubber.

A continuous lighting experiment was conducted on the lamp 208 loaded in the backlight unit of Example 6, under the same conditions as the experiment for the lamp with the basic construction. According to the results of the experiment, it was found that the temperature disequilibrium had almost been eliminated, that the blackening deviation was not observed, and that the rated life was achieved.

Also, the above-described continuous lighting experiment was conducted with a lamp that has the same construction as the lamp 208 except that the glass bulb 210 of the lamp is a straight tube. According to the results of the experiment, it was found that the temperature disequilibrium had almost been eliminated, with the high-voltage-side end surface temperature being approximately 110° C., and the ground-side end surface temperature being approximately 112° C.

3. Direct-Below-Type Backlight Unit

Up to now, the present invention has been explained through various cases in which the lamps of the present invention are applied to an edge-light-type backlight unit. However, the present invention can also be applied to direct-below-type backlight units such as the backlight unit 1000 shown in FIG. 3. The following describes the case where the present invention is applied to the edge-light-type backlight unit 1000.

EXAMPLE 7

Figure 30:
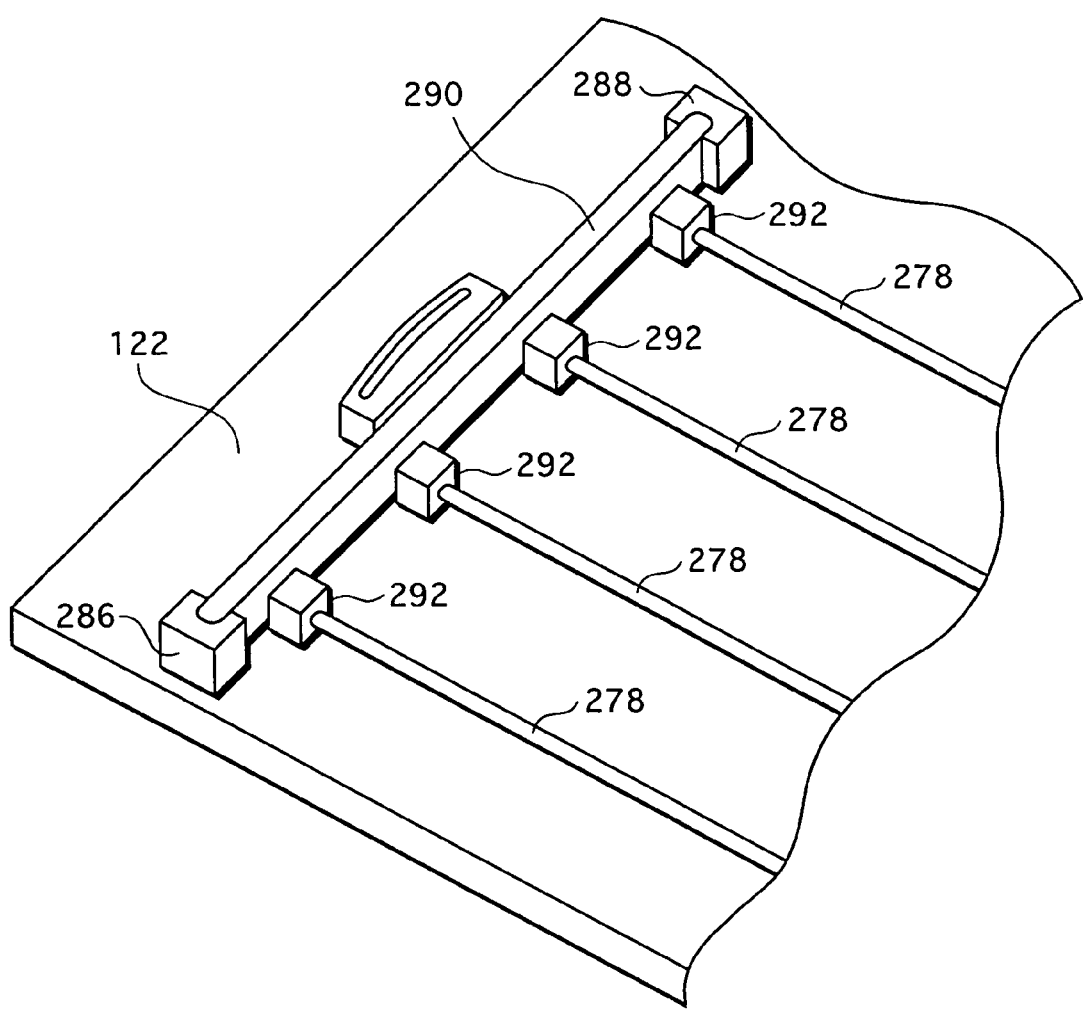
FIG. 30 shows how cold-cathode fluorescent lamps are held in Example 7.

FIG. 30 shows how lamps 278 are arranged in the outer container 120 (see FIG. 3) of the backlight unit 1000.

FIG. 30 shows part of the construction on the reflection plate (bottom plate) 122, where the side plates 124, diffusion plate 140, diffusion sheet 142, and lens sheet 144 are omitted for convenience's sake. The ground-side ends of the lamps 278 are shown in FIG. 30.

On the reflection plate 122, a printed circuit board 290 is disposed held by printed circuit board holding members (hereinafter referred to merely as holding members) 286 and 288 that are in the shape of character U in the transverse cross section and are disposed to face each other.

A bush 292 made of silicon rubber is attached to each of the lamps 278. As will be detailed later, a lead wire 296 (see FIG. 31) extends out through the bush 292 and is supported by the printed circuit board 290. Similarly, the high-voltage-side ends of the lamps 278 are supported by a printed circuit board 304 (see FIG. 31).

Figure 31:
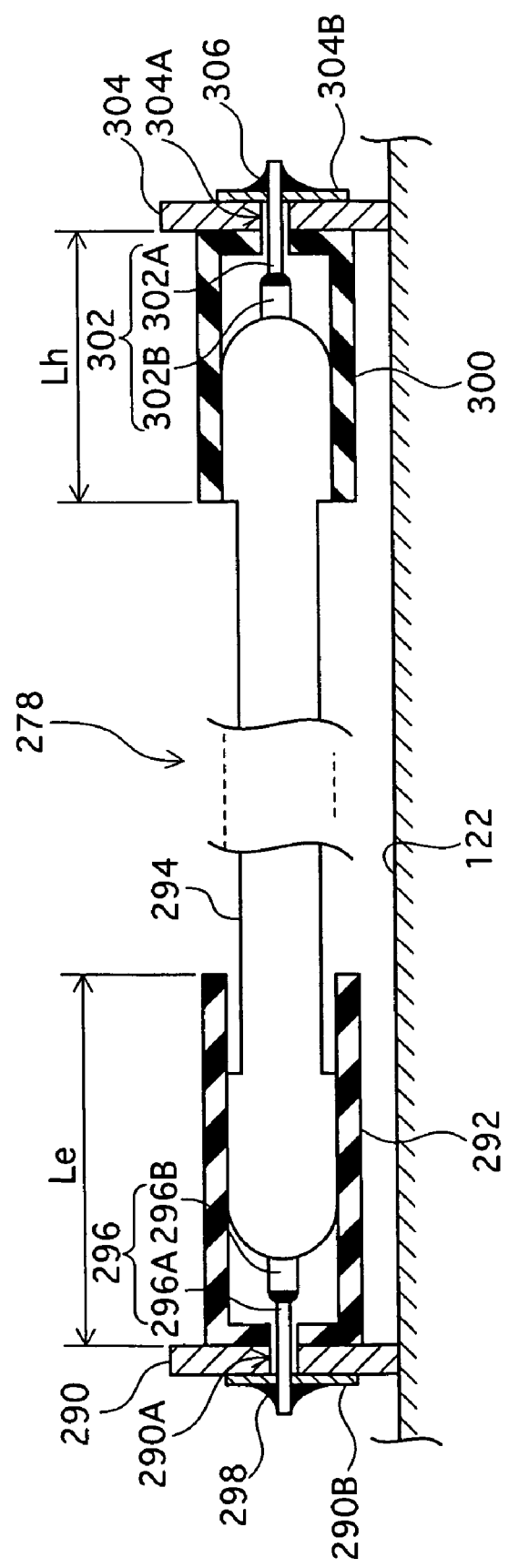
FIG. 31 shows how cold-cathode fluorescent lamps are held in Example 7.

FIG. 31 is a sectional view of a lamp 278 shown in FIG. 30, taken along the tube axis thereof.

As mentioned above, the bush 292 is attached to the ground-side end of the lamp 278. Lead wires 296, each of which is composed of an inner lead wire 296B and an outer lead wire 296A, are connected to the two ends of the glass bulb 294, respectively. The outer lead wire 296A extends out through a through hole 290A formed in the printed circuit board 290. The tip of the outer lead wire 296A extending out from the through hole 290A is connected to a wire 290B, which is formed on the printed circuit board 290, by solder 298.

The high-voltage-side ends of the lamps 278 are connected similarly. That is to say, a bush 300 is attached to the high-voltage-side end of the lamp 278. Lead wires 302, each of which is composed of an inner lead wire 302B and an outer lead wire 302A, are connected to the two ends of the glass bulb 294, respectively. The outer lead wire 302A extends out through a through hole 304A formed in a printed circuit board 304. The tip of the outer lead wire 302A extending out from the through hole 304A is connected to a wire 304B, which is formed on the printed circuit board 304, by solder 306. It should be noted here that the bushes 292 and 300 are in the same shape in the transverse cross section.

It should be noted here that the transverse cross section area of the high-voltage-side wire 304B connected to the high-voltage-side lead wire 302 is set to be larger than the transverse cross section area of the ground-side wire 290B connected to the ground-side lead wire 296. That is to say, the ground-side wire 290B is lower than the high-voltage-side wire 304B in the heat conductivity. For this reason, as is the case with the backlight unit having the basic construction of the edge-light type, the problem of the lamp short life caused by the disequilibrium in the temperature occurs to the direct-below-type backlight units.

To solve the problem, in the present example, the heat radiation area of the ground-side bush 292 is set to be larger than the heat radiation area of the high-voltage-side bush 300 (the heat radiation area of the high-voltage-side bush 300 is set to be smaller than the heat radiation area of the ground-side bush 292). This is because the disequilibrium in the temperature between the two ends of the glass bulb 294 is eliminated by reducing the temperature at the ground-side end by increasing the amount of heat radiated from the ground-side end surface.

Also, in regards with the bushes 292 and 300 that have the same shape in the transverse cross section, an overall length Le of the ground-side bush 292 is set to be longer than an overall length Lh of the high-voltage-side bush 300.

With this arrangement, the problem of the short life due to the disequilibrium in the temperature is solved.

In the present example, a difference in the heat radiation is produced between the high-voltage-side and the ground-side bushes by producing a difference in the heat radiation area between the bushes. However, a method of producing a difference in the heat radiation is not limited to this. For example, even if bushes having the same shape and size are used, the material of the high-voltage-side bush may be lower than the material of the ground-side bush in heat conductivity (or conversely, the material of the ground-side bush may be higher than the material of the high-voltage-side bush in heat conductivity). More specifically, the high-voltage-side bush may be made of fluorocarbon rubber, and the ground-side bush may be made of silicon with a filler having high heat conductivity.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A cold-cathode fluorescent lamp comprising:
   a glass bulb; and
   a pair of electrodes which are cylindrical and respectively inserted in two ends of the glass bulb, wherein
   two end portions of the glass bulb are substantially circular in transverse cross section, the two end portions respectively corresponding to the inserted pair of electrodes in length, and at least part of a middle portion of the glass bulb is flat in transverse cross section, the middle portion corresponding to a space in the glass bulb between the pair of electrodes.

2. The cold-cathode fluorescent lamp of claim 1, wherein a portion of the glass bulb, which corresponds to a middle part of an area inside the glass bulb where a positive column is generated when the cold-cathode fluorescent lamp is lighted, is flat in transverse cross section.

3. The cold-cathode fluorescent lamp of claim 1, wherein a value, which is obtained by dividing (i) a value of an amount of power consumed by a positive column discharge by (ii) a value of an outer surface area of a portion of the glass bulb which corresponds to an area inside the glass bulb where a positive column is generated when the cold-cathode fluorescent lamp is lighted, is set to be in a range from 45 mW/cm2 to 90 mW/cm2.

4. The cold-cathode fluorescent lamp of claim 1, wherein a minimum inner diameter of a flat shape of the glass bulb in transverse cross section is in a range from 1.0 mm to 3.0 mm.

5. A backlight unit comprising:
   a rectangular outer container whose bottom is a reflection plate and sides are plates; and
   a plurality of cold-cathode fluorescent lamps that are arranged in parallel to each other at regular intervals in the outer container, wherein
   each of the plurality of cold-cathode fluorescent lamps includes a glass bulb and a pair of electrodes which are cylindrical and respectively inserted in two ends of the glass bulb, wherein two end portions of the glass bulb are substantially circular in transverse cross section, the two end portions respectively corresponding to the inserted pair of electrodes in length, and at least part of a middle portion of the glass bulb is flat in transverse cross section, the middle portion corresponding to a space in the glass bulb between the pair of electrodes, and the plurality of cold-cathode fluorescent lamps being arranged so that a long axis of a flat shape of the glass bulb in the transverse cross section is substantially in parallel with a main surface of the reflection plate.

6. The cold-cathode fluorescent lamp of claim 1, wherein the glass bulb is filled with a mix gas of rare gases which include at least neon and krypton.

7. The cold-cathode fluorescent lamp of claim 1 further comprising:
   a first lead wire that is attached to a first end of the glass bulb; and
   a second lead wire that is attached to a second end of the glass bulb, wherein
   a first electrode, which is one of the pair of electrodes, is connected to an end of the first lead wire inside the glass bulb, and
   a second electrode, which is the other of the pair of electrodes, is connected to an end of the second lead wire inside the glass bulb, wherein
   an end of the first lead wire outside the glass bulb is connected to high-voltage-side wiring connecting to an external power source, and an end of the second lead wire outside the glass bulb is connected to ground-side wiring connecting to the external power source, the ground-side wiring being lower than the high-voltage-side wiring in heat conductivity, and
   materials of the first electrode and the second electrode are selected so that when the cold-cathode fluorescent lamp is lighted, the first electrode is higher than the second electrode in heating value.

8. The cold-cathode fluorescent lamp of claim 7, wherein the first electrode is smaller than the second electrode in effective electrode surface area.

9. The cold-cathode fluorescent lamp of claim 8, wherein a value of area ratio obtained by dividing a value of effective electrode surface area of the first electrode by a value of effective electrode surface area of the second electrode is set to be in a range from 0.5 to 0.9.

10. The cold-cathode fluorescent lamp of claim 7, wherein a metal material forming the first electrode is higher than a metal material forming the second electrode in work function.

11. The cold-cathode fluorescent lamp of claim 1 further comprising:
    a first lead wire that is attached to a first end of the glass bulb; and
    a second lead wire that is attached to a second end of the glass bulb, wherein
    a first electrode, which is one of the pair of electrodes, is connected to an end of the first lead wire inside the glass bulb, and
    a second electrode, which is the other of the pair of electrodes, is connected to an end of the second lead wire inside the glass bulb, wherein
    an end of the first lead wire outside the glass bulb is connected to high-voltage-side wiring connecting to an external power source, and an end of the second lead wire outside the glass bulb is connected to ground-side wiring connecting to the external power source, the ground-side wiring being lower than the high-voltage-side wiring in heat conductivity, and
    the first lead wire is lower than the second lead wire in heat conductivity.

12. The cold-cathode fluorescent lamp of claim 11, wherein
    the first lead wire is smaller than the second lead wire in cross section area.

13. The cold-cathode fluorescent lamp of claim 12, wherein
    the first and second lead wires are circular in transverse cross section, and a value of wire diameter ratio obtained by dividing a value of outer diameter of the first lead wire by a value of outer diameter of the second lead wire is set to be in a range from 0.65 to 0.85.

14. A backlight unit comprising:
    the cold-cathode fluorescent lamp defined in claim 1 in which a first lead wire, which is connected to a first electrode being one of the pair of electrodes, extends out from one of the two ends of the glass bulb, and a second lead wire, which is connected to a second electrode being the other of the pair of electrodes, extends out from the other of the two ends of the glass bulb;
    high-voltage-side wiring that is connected to the first lead wire to supply power from a power circuit;
    ground-side wiring that is connected to the second lead wire to supply power from the power circuit, the ground-side wiring being lower than the high-voltage-side wiring in heat conductivity;
    a first electrically insulating bush that is attached firmly to the end of the glass bulb from which the first lead wire extends out, and covers the end of the glass bulb and the first lead wire;
    a second electrically insulating bush that is attached firmly to and covers the end of the glass bulb from which the second lead wire extends out;
    a supporting member which, made of a material higher than the first and second electrically insulating bushes in heat conductivity, supports the first and second electrically insulating bushes, wherein
    an arrangement is made so that heat conduction from the first electrically insulating bush to the supporting member is lower than heat conduction from the second electrically insulating bush to the supporting member in heat conductivity.

15. The backlight unit of claim 14, wherein
    a heat insulating medium, which is lower than the first electrically insulating bush in heat conductivity, is disposed between the first electrically insulating bush and the supporting member, and the second electrically insulating bush is in direct contact with the supporting member.

16. The backlight unit of claim 14, wherein
    an area with which the first electrically insulating bush is in contact with the supporting member is smaller than an area with which the second electrically insulating bush is in contact with the supporting member.

17. The backlight unit of claim 14, wherein
    a contact pressure with which the first electrically insulating bush is in contact with the supporting member is lower than a contact pressure with which the second electrically insulating bush is in contact with the supporting member.

18. A backlight unit comprising:
    the cold-cathode fluorescent lamp defined in claim 1 in which a first lead wire, which is connected to a first electrode being one of the pair of electrodes, extends out from one of the two ends of the glass bulb, and a second lead wire, which is connected to a second electrode being the other of the pair of electrodes, extends out from the other of the two ends of the glass bulb;

high-voltage-side wiring that is connected to the first lead wire to supply power from a power circuit;

ground-side wiring that is connected to the second lead wire to supply power from the power circuit, the ground-side wiring being lower than the high-voltage-side wiring in heat conductivity;

a first electrically insulating bush that is attached firmly to and covers the end of the glass bulb from which the first lead wire extends out; and a second electrically insulating bush that is attached firmly to and covers the end of the glass bulb from which the second lead wire extends out, wherein the first electrically insulating bush is lower than the second electrically insulating bush in heat radiation in terms of heat absorbed from a surface of the glass bulb when the cold-cathode fluorescent lamp is lighted.

19. The backlight unit of claim 18, wherein
a heat radiation area of the first electrically insulating bush is lower than a heat radiation area of the second electrically insulating bush.

20. The backlight unit of claim 18, wherein
the first electrically insulating bush is made of a material that is lower than a material of the second electrically insulating bush in heat conductivity.

21. The cold-cathode fluorescent lamp of claim 1 wherein
a minimum inner diameter of the flat part of the middle portion is smaller than a minimum inner diameter of the substantially circular portions.

22. The backlight unit of claim 5 wherein
a minimum inner diameter of the flat part of the middle portion is smaller than a minimum inner diameter of the substantially circular portions.

* * * * *